United States Patent
Scalea et al.

(10) Patent No.: US 10,906,464 B2
(45) Date of Patent: *Feb. 2, 2021

(54) EXTERNAL AUDIO ALERT SYSTEM AND METHOD FOR VEHICULAR USE

(71) Applicant: Advanced Sonic Alert Technologies, LLC, Hyannis Port, MA (US)

(72) Inventors: Robert S. Scalea, Hyannis Port, MA (US); Jeffrey M. Rubenstein, Hamilton, NY (US)

(73) Assignee: Advanced Sonic Alert Technologies, LLC, Hyannis Port, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,465

(22) Filed: Dec. 20, 2019

(65) Prior Publication Data
US 2020/0122638 A1 Apr. 23, 2020

Related U.S. Application Data

(63) Continuation of application No. 16/275,458, filed on Feb. 14, 2019, now Pat. No. 10,525,876, which is a
(Continued)

(51) Int. Cl.
*B60Q 5/00* (2006.01)
*B60Q 1/52* (2006.01)
(Continued)

(52) U.S. Cl.
CPC ............ *B60Q 5/006* (2013.01); *B60Q 1/525* (2013.01); *B60Q 5/00* (2013.01); *B60Q 9/008* (2013.01);
(Continued)

(58) Field of Classification Search
CPC .......... B60Q 5/006; B60Q 1/525; B60Q 5/00; B60Q 9/008; G07C 5/0833; G08B 21/18; G08G 1/0965; G08G 1/192
(Continued)

(56) References Cited

U.S. PATENT DOCUMENTS 3,909,842 A 9/1975 Noji
4,342,023 A 7/1982 Tsunoda et al.
(Continued)

FOREIGN PATENT DOCUMENTS

DE 27 56 750 A1 6/1979
DE 195 29 738 A1 2/1997
(Continued)

OTHER PUBLICATIONS

Dahl, *How to Add Custom Car Horn Sounds to Your Vehicle*, http://www.popularmechanics.com/cars/how-to/a23253/how-to-add-custom-sounds-to-your-car-horn/ , Hearst Communications, Inc., Popular Mechanics, 5 pages, Oct. 6, 2016.
(Continued)

*Primary Examiner* — Kerri L McNally
(74) *Attorney, Agent, or Firm* — Sunstein LLP

(57) ABSTRACT

In embodiments of the present invention, an Alert Controller coupled to an Internal Digital Communication System ("IDCS") of a vehicle monitors vehicle states based on messages received over the IDCS and generates audio alerts projected external to the vehicle based on the vehicle states. Multiple vehicle states may be defined, with each vehicle state associated with receipt of one or more types of messages in a particular sequence and/or within a particular timeframe. Different audio alerts may be assigned to different vehicle states. The audio alerts may be customizable such as by the vehicle manufacturer and/or vehicle owner/
(Continued)

operator. An alert selection interface may be provided in the vehicle for user-selection of audio alerts.

20 Claims, 20 Drawing Sheets

Related U.S. Application Data continuation of application No. 16/011,087, filed on Jun. 18, 2018, now Pat. No. 10,207,639, which is a continuation of application No. 15/789,221, filed on Oct. 20, 2017, now Pat. No. 10,000,152.

(60) Provisional application No. 62/529,533, filed on Jul. 7, 2017.

(51) Int. Cl.
| | | |
|---|---|---|
| *G08B 21/18* | (2006.01) | |
| *B60Q 9/00* | (2006.01) | |
| *G08G 1/16* | (2006.01) | |
| *G08B 3/10* | (2006.01) | |
| *G08G 1/0965* | (2006.01) | |
| *G07C 5/08* | (2006.01) | |
| *B60Q 1/50* | (2006.01) | |
| *G10K 15/00* | (2006.01) | |

(52) U.S. Cl.
CPC ............. *G07C 5/0833* (2013.01); *G08B 3/10* (2013.01); *G08B 21/18* (2013.01); *G08G 1/0965* (2013.01); *G08G 1/162* (2013.01); *B60Q 1/50* (2013.01); *B60Q 5/005* (2013.01); *G08G 1/166* (2013.01); *G10K 15/00* (2013.01)

(58) Field of Classification Search
USPC ........................................................ 340/436
See application file for complete search history.

(56) References Cited

U.S. PATENT DOCUMENTS

| | | | |
|---|---|---|---|
| 4,785,280 A | 11/1988 | Fubini et al. | |
| 5,245,694 A | 9/1993 | Zwern | |
| 5,293,155 A | 3/1994 | Nicol et al. | |
| 5,572,488 A | 11/1996 | Yamada et al. | |
| 5,979,586 A | 11/1999 | Farmer et al. | |
| 6,040,761 A | 3/2000 | Grasmann | |
| 6,788,188 B2 | 9/2004 | Sague | |
| 7,106,180 B1 | 9/2006 | Pompei | |
| 8,963,701 B2 | 2/2015 | Rodriguez Barros et al. | |
| 9,718,405 B1* | 8/2017 | Englander | B60K 35/00 |
| 10,000,152 B1* | 6/2018 | Scalea | B60Q 9/008 |
| 10,207,639 B2* | 2/2019 | Scalea | B60Q 1/525 |
| 10,525,876 B2* | 1/2020 | Scalea | G08G 1/0965 |
| 2005/0280524 A1* | 12/2005 | Boone | G09F 21/04 340/461 |
| 2007/0242836 A1 | 10/2007 | Basir et al. | |
| 2008/0114904 A1 | 5/2008 | Kosco | |
| 2008/0197998 A1* | 8/2008 | Campmans | G10K 11/26 340/463 |
| 2008/0252466 A1* | 10/2008 | Yopp | B60K 28/066 340/576 |
| 2011/0029875 A1 | 2/2011 | Milch | |
| 2011/0199199 A1* | 8/2011 | Perkins | B60Q 9/008 340/435 |
| 2014/0240118 A1* | 8/2014 | Lee | B60Q 5/008 340/463 |
| 2014/0266658 A1 | 9/2014 | Feldman | |
| 2016/0129807 A1 | 5/2016 | Okamoto | |
| 2016/0255434 A1* | 9/2016 | Yamamoto | H04R 3/12 381/305 |
| 2016/0304027 A1 | 10/2016 | DiCenso | |

FOREIGN PATENT DOCUMENTS

| | | |
|---|---|---|
| DE | 102005006528 | 8/2006 |
| DE | 102006016034 | 10/2007 |
| EP | 2 682 928 A1 | 1/2014 |
| GB | 2534165 | 7/2017 |
| WO | WO 99/31637 | 6/1999 |

OTHER PUBLICATIONS

Horntones, *Horntones MP3 Car Horn is an air horn, train horn, fog horn and musical horn*, http://www.horntones.com/ , 2 pages, 2017.

Unknown, *Controller Area Network (CAN) Overview*, http://www.ni.com/white-paper/2732/en/, National Instruments, White Paper, 5 pages, Aug. 1, 2014.

Unknown, *Controller Area Network (CAN)—Introduction*, esd electronics, inc. http://www.esd-electronics-usa.com/Controller-Area-Network-CAN-Introduction.html , 6 pages, printed Feb. 18, 2018.

Unknown, *What is a CAN-Bus?*, http://www.impartsp.com.au/products/canbus/about_canbus.shtml , Impartsp, Inventis Technology Pty Limited, 2 pages, printed Feb. 18, 2018.

Wikipedia, *Electric vehicle warning sounds*, https://en.wikipedia.org/wiki/Electric_vehicle_warning_sounds , 18 pages, Mar. 29, 2017.

Yoon, *Pimp Your Honk with Horntones*, http://gizmodo.com/236458/pimp-your-honk-with-horntones , 2 pages, Feb. 13, 2007.

European Patent Office, International Search Report and Written Opinion, prepared by the European Patent Office, for PCT application No. PCT/US2018/040680, dated Oct. 23, 2018, 14 pages.

* cited by examiner

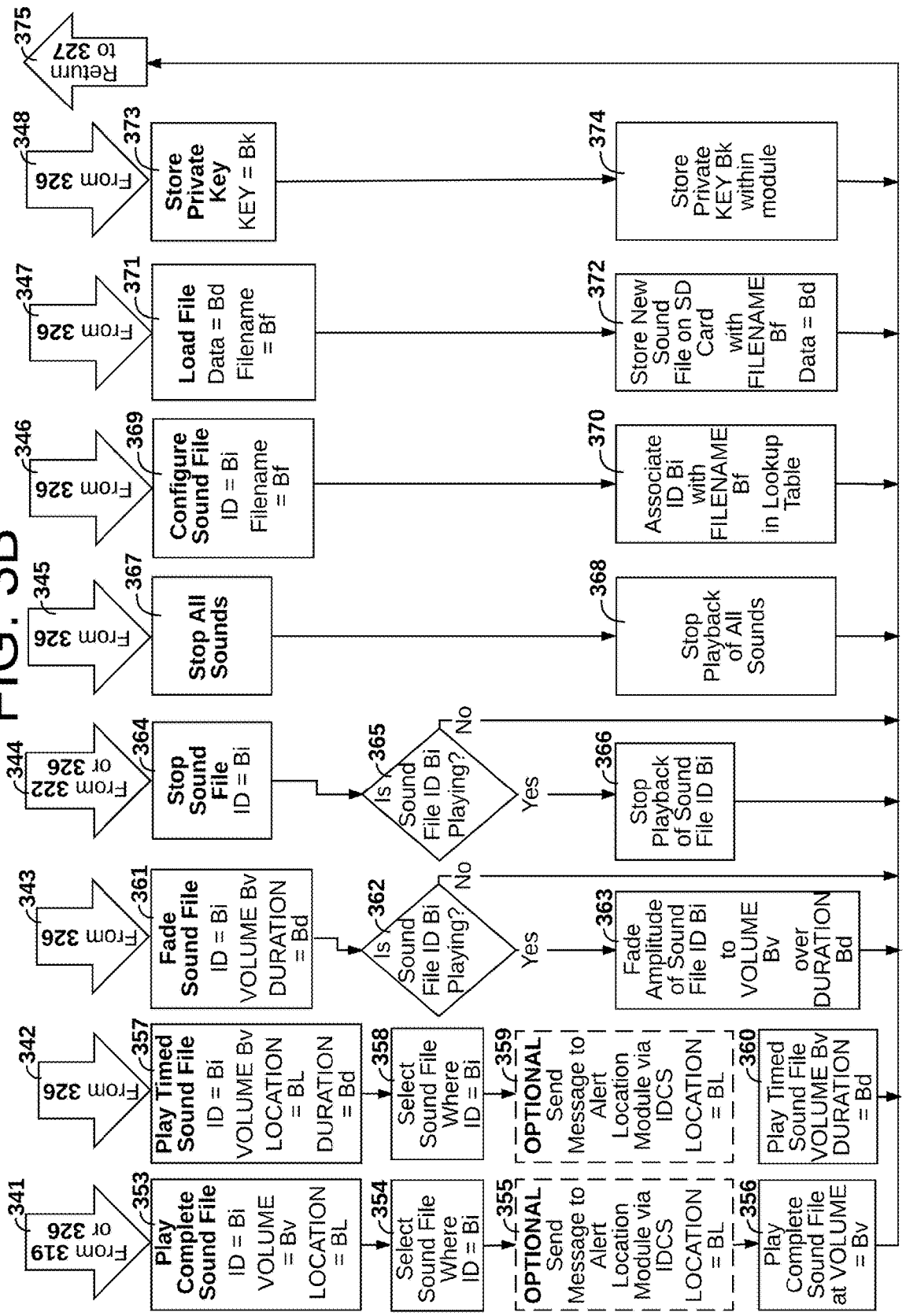

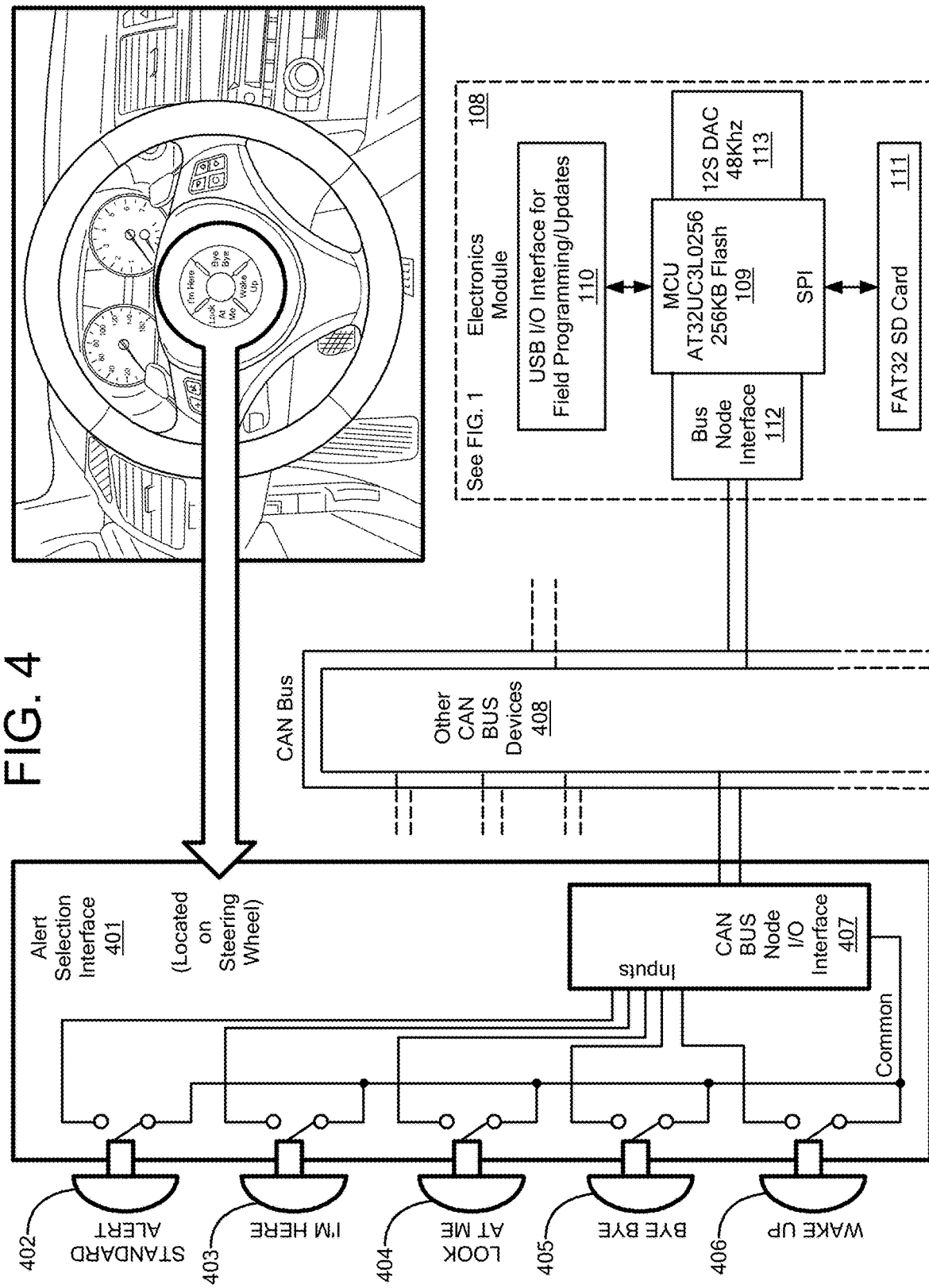

FIG. 5 - Full System Logic Overview
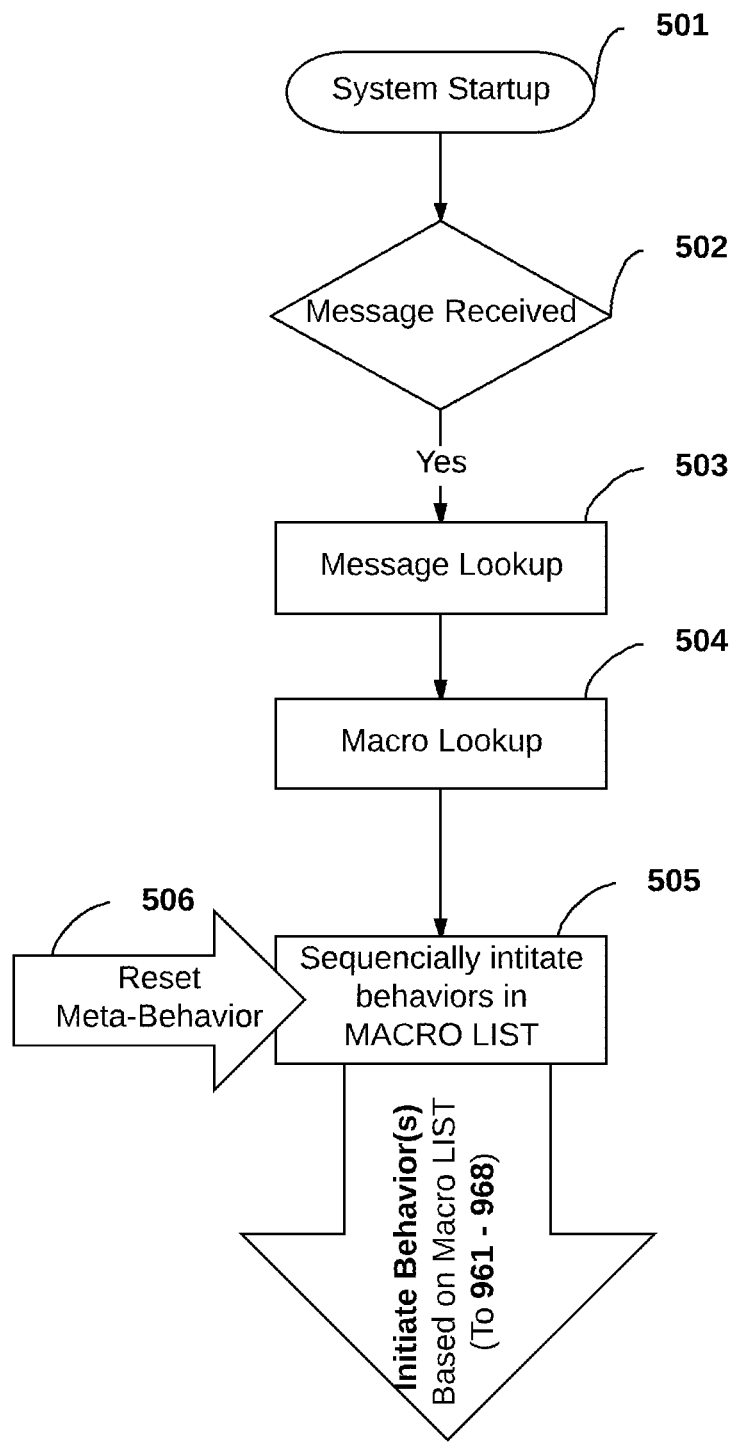

FIG. 6 - Message Lookup to ENTRY LIST Logic Flow
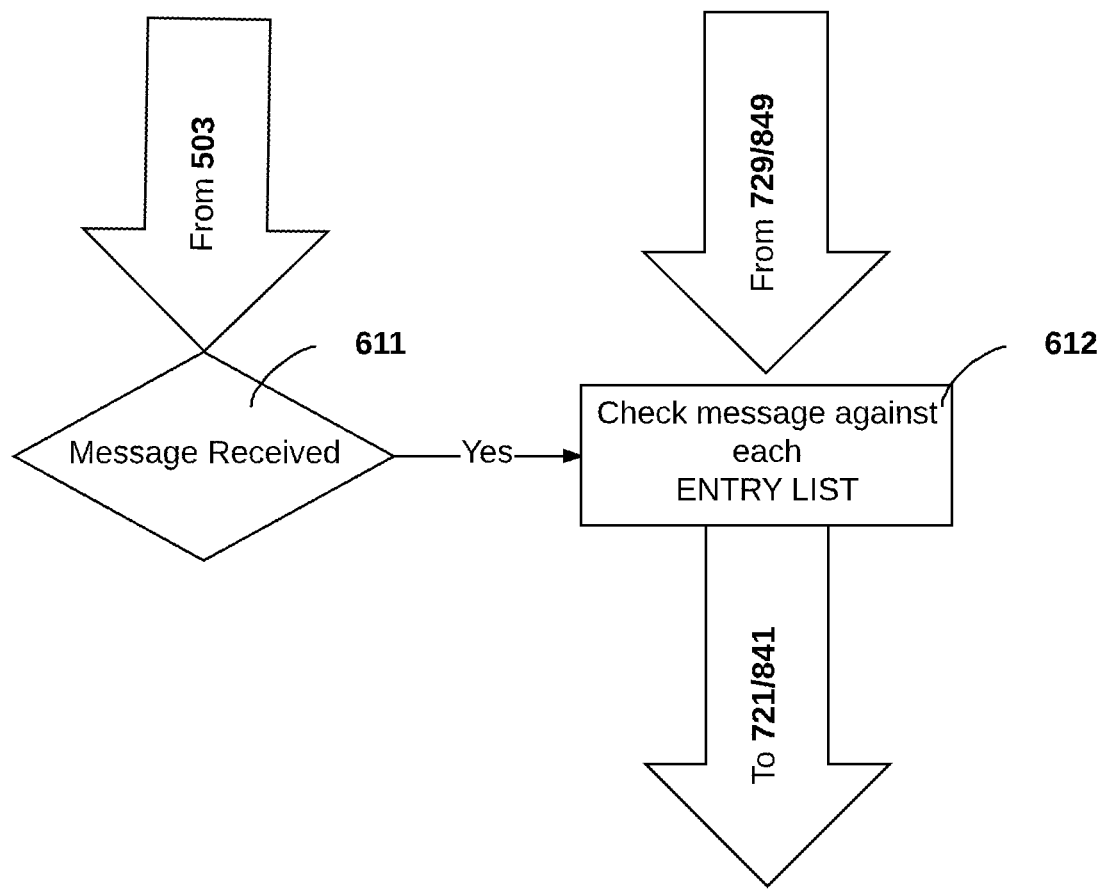

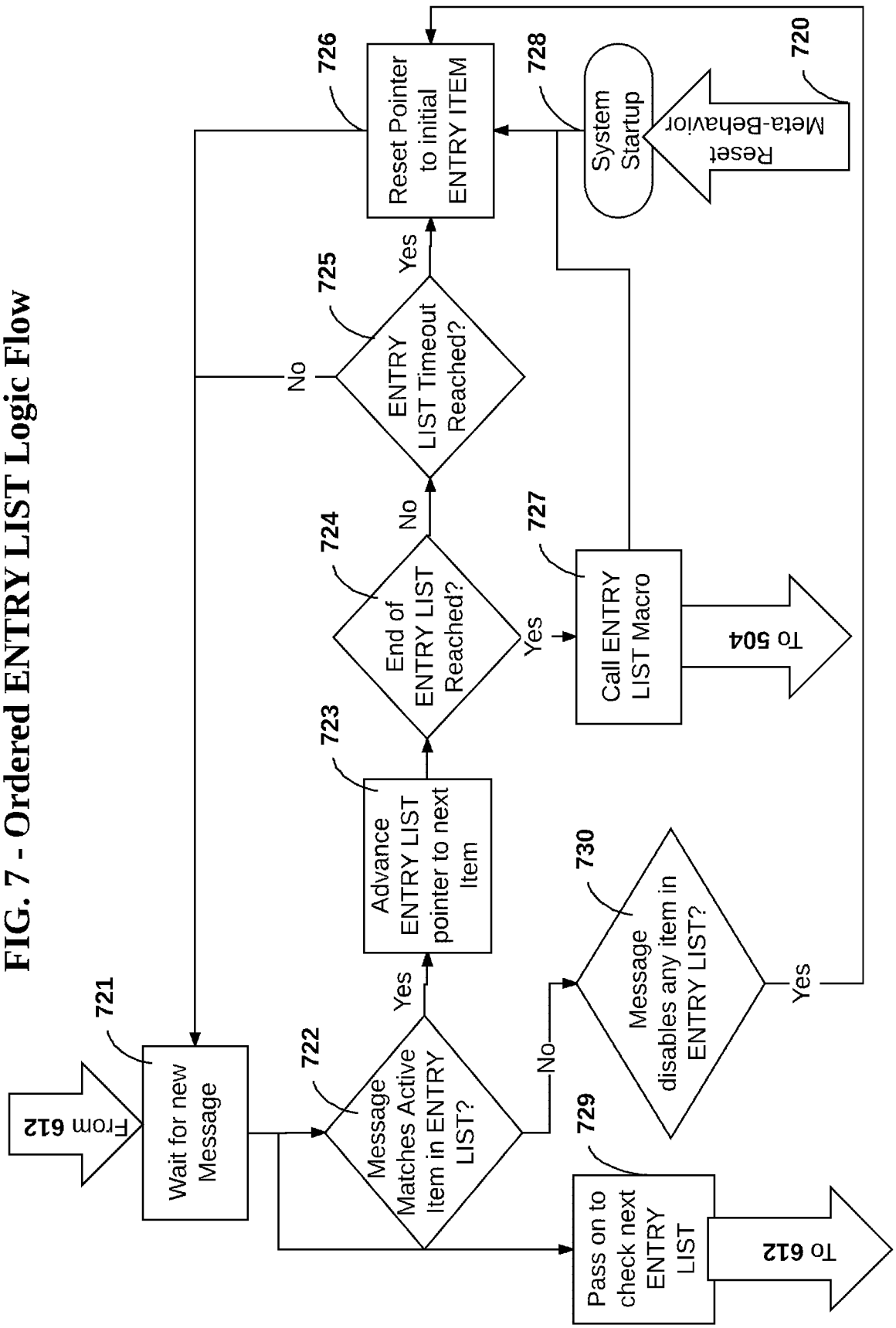
FIG. 7 - Ordered ENTRY LIST Logic Flow

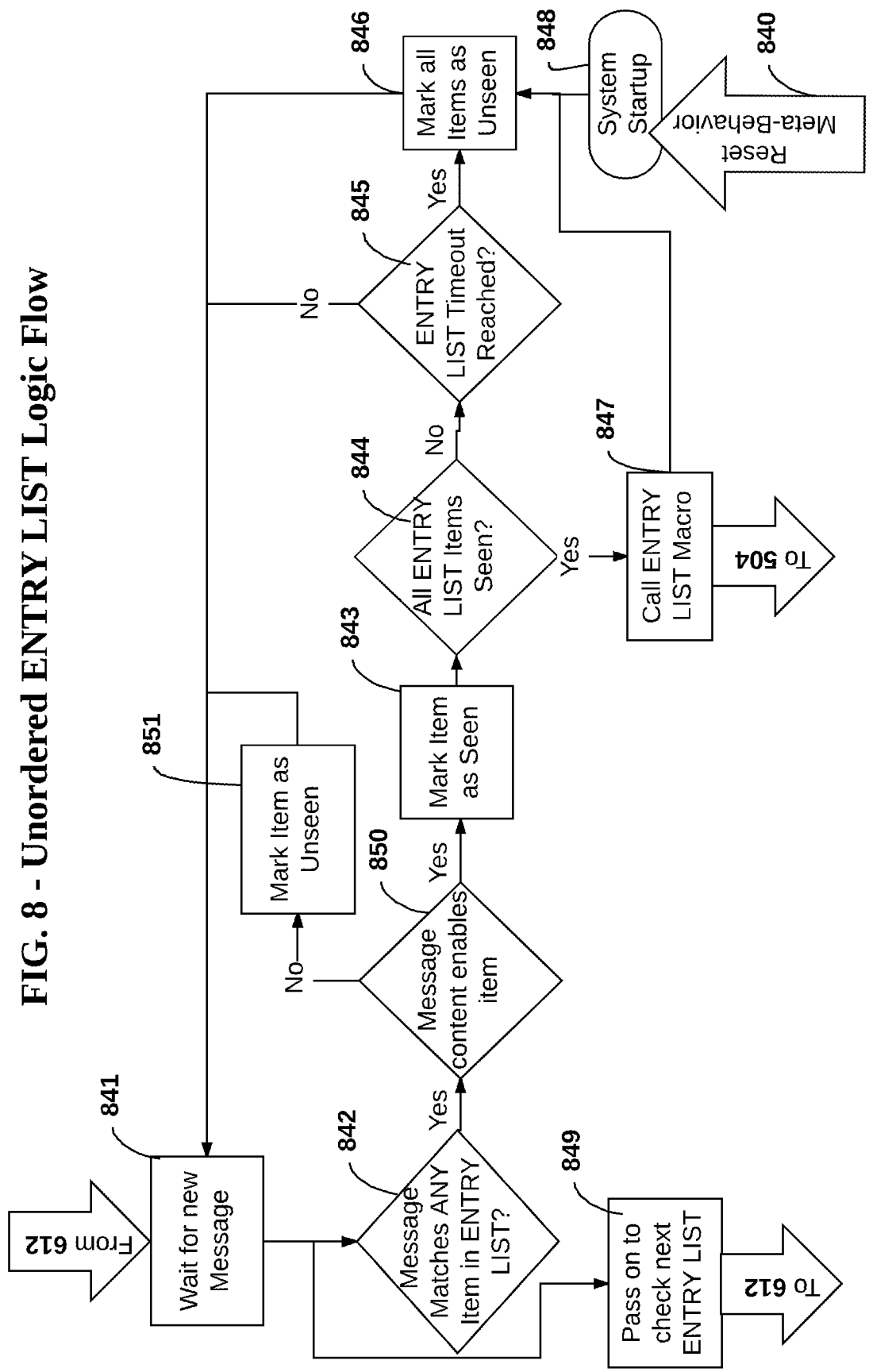
FIG. 8 - Unordered ENTRY LIST Logic Flow

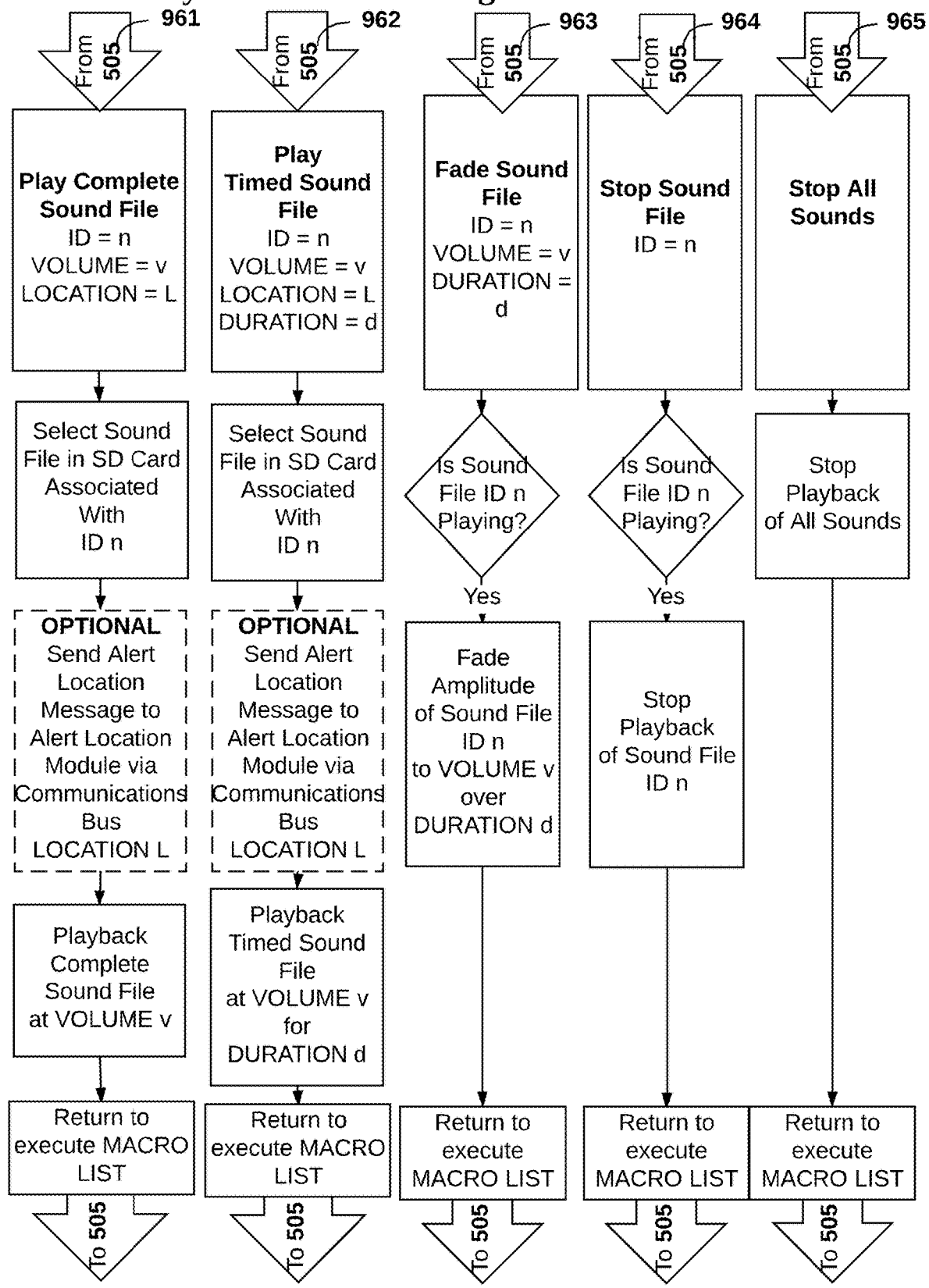
FIG. 9A - System Behaviors Logic Flow

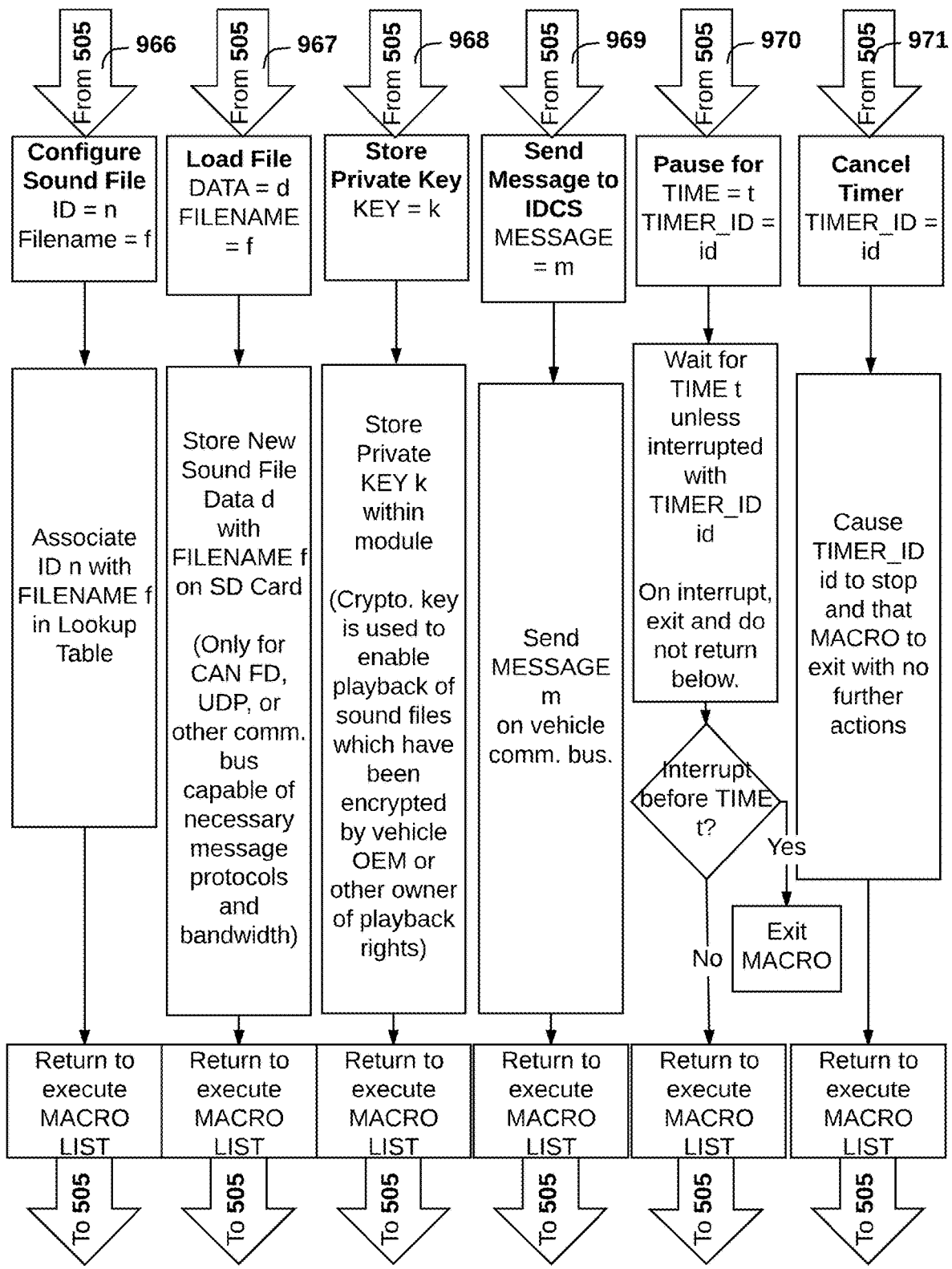
FIG. 9B - System Behaviors Logic Flow

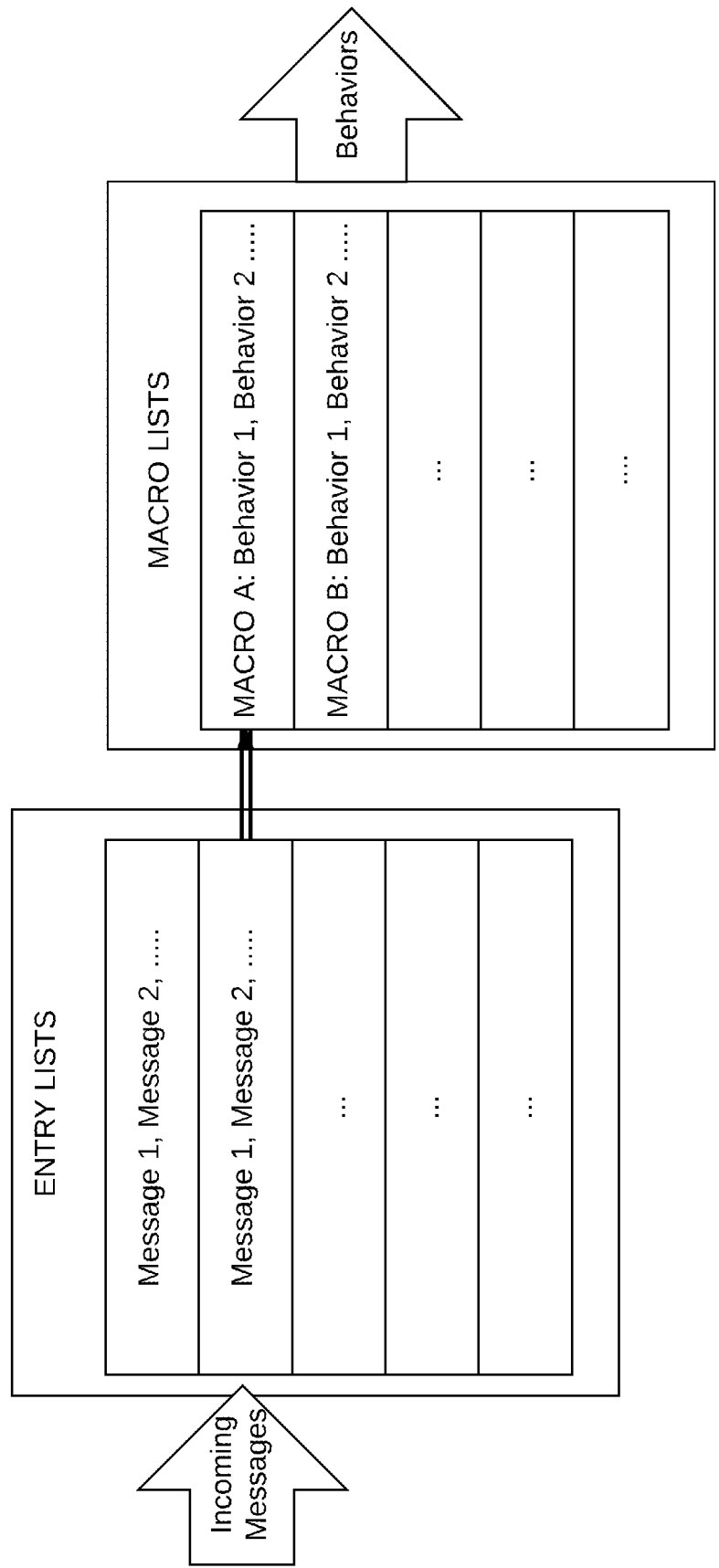
FIG. 10 - Full System Conceptual Overview

FIG. 11

| Table 1 - Portion of Sample Behavior Lookup Table | | | |
|---|---|---|---|
| | | | Rear Impact |
| | Scenario causing external audio alert behavior: | | Vehicle has been impacted from behind. Need to warn vehicles or pedestrians in front of vehicle. |
| Vehicle System / Sensor | Vehicle State Parameter | | |
| Wheel Speed | Ss | Presumed Vehicle Speed | |
| Geographic Location | Sgl | Geographic Location | |
| GPS-Derived Speed | Sx1 | Actual Vehicle Speed | |
| Transmission | Sx2 | Vehicle Direction: Forward vs Reverse | |
| External Proximity Sensors | Sx3 | Location of Nearby Vehicle(s) | Another vehicle present within 30 feet in front |
| External Proximity Sensors | Sx4 | Location of Nearby Pedestrians | |
| Impact Sensors | Sx5 | Impact Detected | Rear impact detected |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | |

| | | Behavior: | Play Timed Sound File |
|---|---|---|---|
| Behavior Parameters | Sound File Id | Bi | "Watch Out" |
| | Volume Level | Bv | Maximum Volume |
| | Location | BL | Front of Vehicle |
| | Duration | Bd | 10,000 msec |

FIG. 12

| Table 2 - Portion of Sample Behavior Lookup Table | | | |
|---|---|---|---|
| | | | Ineffective Brakes (e.g. Skidding) |
| Scenario causing external audio alert behavior: | | | Vehicle's wheels are locked, but vehicle is still moving. May be skidding on snow or ice. Need to warn others. |
| Vehicle System / Sensor | | Vehicle State Parameter | |
| Wheel Speed | Ss | Presumed Vehicle Speed | Zero wheel speed |
| Geographic Location | Sgl | Geographic Location | |
| GPS-Derived Speed | Sx1 | Actual Vehicle Speed | Actual vehicle speed > 2mph for more than 2 seconds |
| Transmission | Sx2 | Vehicle Direction: Forward vs Reverse | |
| External Proximity Sensors | Sx3 | Location of Nearby Vehicle(s) | |
| External Proximity Sensors | Sx4 | Location of Nearby Pedestrians | |
| Impact Sensors | Sx5 | Impact Detected | |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | |

| | Behavior: | | Play Complete Sound File |
|---|---|---|---|
| Behavior Parameters | Sound File Id | Bi | "Watch Out - Ineffective Brakes" |
| | Volume Level | Bv | Maximum Volume |
| | Location | BL | All Directions |
| | Duration | Bd | N/A |

FIG. 13

| Table 3 - Portion of Sample Behavior Lookup Table | | | |
|---|---|---|---|
| | | | Braking Control Regained |
| Scenario causing external audio alert behavior: | | | Wheels were locked, but now no longer skidding. |
| Vehicle System / Sensor | Vehicle State Parameter | | |
| Wheel Speed | Ss | Presumed Vehicle Speed | Was zero, but now comparable to GPS |
| Geographic Location | Sgl | Geographic Location | |
| GPS-Derived Speed | Sx1 | Actual Vehicle Speed | Actual vehicle speed comparable to wheel speed |
| Transmission | Sx2 | Vehicle Direction: Forward vs Reverse | |
| External Proximity Sensors | Sx3 | Location of Nearby Vehicle(s) | |
| External Proximity Sensors | Sx4 | Location of Nearby Pedestrians | |
| Impact Sensors | Sx5 | Impact Detected | |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | |

| | | Behavior: | Stop Sound File |
|---|---|---|---|
| Behavior Parameters | Sound File Id | Bi | "Watch Out - Ineffective Brakes" |
| | Volume Level | Bv | N/A |
| | Location | BL | N/A |
| | Duration | Bd | N/A |

FIG. 14

| Table 4 - Portion of Sample Behavior Lookup Table | | | |
|---|---|---|---|
| | | | Emergency Obstacle |
| Scenario causing external audio alert behavior: | | | While moving, suddenly an obstacle is detected nearby in front of vehicle. (Animal, child, bicyclist, etc.) |
| Vehicle System / Sensor | | Vehicle State Parameter | |
| Wheel Speed | Ss | Presumed Vehicle Speed | Speed greater than 20 mph |
| Geographic Location | Sgl | Geographic Location | |
| GPS-Derived Speed | Sx1 | Actual Vehicle Speed | |
| Transmission | Sx2 | Vehicle Direction: Forward vs Reverse | |
| External Proximity Sensors | Sx3 | Location of Nearby Vehicle(s) | Another vehicle appeared within 30 feet |
| External Proximity Sensors | Sx4 | Location of Nearby Pedestrians | OR an object appeared within 30 feet in front |
| Impact Sensors | Sx5 | Impact Detected | |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | Fully pressed hard for more than 500 msec |
| Accelerator Pedal | Sx12 | Accelerator Pedal Position | |
| Steering System | Sx13 | Steering Wheel Position | |
| Alert Selection Module | Sx14 | Alert Selection Button Press Status | |

| | | Behavior: | Play Timed Sound File |
|---|---|---|---|
| Behavior Parameters | Sound File Id | Bi | "Watch Out" |
| | Volume Level | Bv | Maximum Volume |
| | Location | BL | Front of Vehicle |
| | Duration | Bd | 5,000 msec |

FIG. 15

| Table 5 - Portion of Sample Behavior Lookup Table | | | |
|---|---|---|---|
| | | | External Reminder to Close the Window |
| | Scenario causing external audio alert behavior: | | The driver exits the vehicle in a light drizzle, but a passenger has left one of the windows open. |
| Vehicle System / Sensor | Vehicle State Parameter | | |
| Wheel Speed | Ss | Presumed Vehicle Speed | |
| Geographic Location | Sgl | Geographic Location | |
| GPS-Derived Speed | Sx1 | Actual Vehicle Speed | |
| Transmission | Sx2 | Vehicle Direction: Forward vs Reverse | |
| External Proximity Sensors | Sx3 | Location of Nearby Vehicle(s) | |
| External Proximity Sensors | Sx4 | Location of Nearby Pedestrians | |
| Impact Sensors | Sx5 | Impact Detected | |
| Rain Sensor | Sx6 | Preciptiation Occurring | Rain sensor is detecting rain on windshield |
| Security System | Sx7 | Security System Armed / Disarmed | Security system armed |
| Electric Windows | Sx8 | Position of Windows | A window is open |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | |

| | | | Behavior: | Play Timed Sound File |
|---|---|---|---|---|
| | Behavior Parameters | Sound File Id | Bi | "Ding Ding - A window is open, and I sense rain." |
| | | Volume Level | Bv | Low Volume |
| | | Location | BL | All Directions |
| | | Duration | Bd | N/A |

FIG. 16

| Table 6 - Portion of Sample Behavior Lookup Table | | | |
|---|---|---|---|
| | | | Driver Initiated External Alert Sound |
| Scenario causing external audio alert behavior: | | | The driver chose an external alert sound on the Alert Selection Module. ("I'm Here", "Look At Me", "Bye Bye", "Wake Up", etc.) |
| Vehicle System / Sensor | Vehicle State Parameter | | |
| Wheel Speed | Ss | Presumed Vehicle Speed | |
| Geographic Location | Sgl | Geographic Location | |
| GPS-Derived Speed | Sx1 | Actual Vehicle Speed | |
| Transmission | Sx2 | Vehicle Direction: Forward vs Reverse | |
| External Proximity Sensors | Sx3 | Location of Nearby Vehicle(s) | |
| External Proximity Sensors | Sx4 | Location of Nearby Pedestrians | |
| Impact Sensors | Sx5 | Impact Detected | |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | A button is pressed |

| | | Behavior: | Play Complete Sound File |
|---|---|---|---|
| Behavior Parameters | Sound File Id | Bi | As per the specific button pressed |
| | Volume Level | Bv | Maximum Volume |
| | Location | BL | All Directions |
| | Duration | Bd | N/A |

FIG. 17

| Table 7 - Portion of Sample Behavior Lookup Table | | | |
|---|---|---|---|
| Scenario causing external audio alert behavior: | | | Driver Initiated External Alert w/Optional Intelligent Volume Ctrl |
| | | | The driver chose an external alert sound on the Alert Selection Module. ("I'm Here", "Look At Me", "Bye Bye", "Wake Up", etc.) |
| Vehicle System / Sensor | Vehicle State Parameter | | |
| Wheel Speed | Ss | Presumed Vehicle Speed | Speed greater than or less than 40 mph? See Fig. 3A |
| Geographic Location | Sgl | Geographic Location | Neighborhood, or not Neighborhood |
| GPS-Derived Speed | Sx1 | Actual Vehicle Speed | |
| Transmission | Sx2 | Vehicle Direction: Forward vs Reverse | |
| External Proximity Sensors | Sx3 | Location of Nearby Vehicle(s) | |
| External Proximity Sensors | Sx4 | Location of Nearby Pedestrians | |
| Impact Sensors | Sx5 | Impact Detected | |
| Rain Sensor | Sx6 | Preciptiation Occurring | |
| Security System | Sx7 | Security System Armed / Disarmed | |
| Electric Windows | Sx8 | Position of Windows | |
| Electric Sunroof | Sx9 | Position of Sunroof | |
| Anti-Skid Braking System | Sx10 | Anti-Skid Braking Active | |
| Brake Pedal | Sx11 | Brake Pedal Position | |
| Accelerator Pedal | Sx12 | Accelerator Pedal Position | |
| Steering System | Sx13 | Steering Wheel Position | |
| Alert Selection Module | Sx14 | Alert Selection Button Press Status | A button was pressed |
| | | Behavior: | Play Complete Sound File |
| Behavior Parameters | Sound File Id | Bi | As per the specific button pressed |
| | Volume Level | Bv | As determined by state parameters Ss and Sgl. |
| | Location | BL | As defined by the specific button pressed |
| | Duration | Bd | N/A |

FIG. 18

| Table 8 - Portion of Sample Behavior Lookup Table | | |
|---|---|---|
| | | Driver Released Alert Sound Button |
| Scenario causing external audio alert behavior: | | The driver had pressed one of the buttons on the Alert Selection Module, and now he/she has released it. |
| Vehicle System / Sensor | Vehicle State Parameter | |
| Wheel Speed | Ss Presumed Vehicle Speed | |
| Geographic Location | Sgl Geographic Location | |
| GPS-Derived Speed | Sx1 Actual Vehicle Speed | |
| Transmission | Sx2 Vehicle Direction: Forward vs Reverse | |
| External Proximity Sensors | Sx3 Location of Nearby Vehicle(s) | |
| External Proximity Sensors | Sx4 Location of Nearby Pedestrians | |
| Impact Sensors | Sx5 Impact Detected | |
| Rain Sensor | Sx6 Preciptiation Occurring | |
| Security System | Sx7 Security System Armed / Disarmed | |
| Electric Windows | Sx8 Position of Windows | |
| Electric Sunroof | Sx9 Position of Sunroof | |
| Anti-Skid Braking System | Sx10 Anti-Skid Braking Active | |
| Brake Pedal | Sx11 Brake Pedal Position | |
| Accelerator Pedal | Sx12 Accelerator Pedal Position | |
| Steering System | Sx13 Steering Wheel Position | |
| Alert Selection Module | Sx14 Alert Selection Button Press Status | A button has been released |

| | | | Behavior: | Stop Sound File |
|---|---|---|---|---|
| Behavior Parameters | | Sound File Id | Bi | As per the specific button released |
| | | Volume Level | Bv | N/A |
| | | Location | BL | N/A |
| | | Duration | Bd | N/A |

EXTERNAL AUDIO ALERT SYSTEM AND METHOD FOR VEHICULAR USE

CROSS-REFERENCE TO RELATED APPLICATION(S)

This patent application is a continuation of U.S. patent application Ser. No. 16/275,458 entitled External Audio Alert System and Method for Vehicular Use filed Feb. 14, 2019, which in turn is a continuation of U.S. patent application Ser. No. 16/011,087 entitled External Audio Alert System and Method for Vehicular Use filed Jun. 18, 2018, which in turn is a continuation of U.S. patent application Ser. No. 15/789,221 entitled External Audio Alert System and Method for Vehicular Use filed Oct. 20, 2017 (now issued as U.S. Pat. No. 10,000,152), which claims the benefit of U.S. Provisional Patent Application No. 62/529,533 entitled External Audio Alert System and Method for Vehicular Use filed Jul. 7, 2017. Each of these patent applications is hereby incorporated herein by reference in its entirety.

TECHNICAL FIELD

The present invention relates to audio alert systems, and more particularly to systems and methods for producing audio alerts for vehicular use wherein the alerts are external to the vehicle.

BACKGROUND ART

Typically, the driver of a vehicle accomplishes the alerting of others outside the vehicle by means of pressing a "horn" button, most commonly located on the vehicle's steering wheel. Traditionally, the pressing of the horn button accomplishes the closing of an electrical circuit, resulting in current flowing through copper conductors to one or more electric horns under the hood, each of which produces a relatively high sound pressure level audio alert, at a fixed pitch and volume, by means of a vibrating diaphragm and a coupled horn-shaped coupler to optimize the transfer of the sound to the outside air. These systems typically produce a sound omnidirectionally having a duration governed by the duration of depression of the horn button.

SUMMARY OF THE EMBODIMENTS

In accordance with one embodiment of the invention, a method of producing an external audio alert for use in the course of operation of a motor vehicle, through execution of computer processes by an alert processor coupled to an internal digital communication system for controlling at least a motor of the vehicle, comprises processing by the alert processor of messages in the system to characterize a current state of the vehicle; processing by the alert processor of the current vehicle state to determine whether an alert condition is present; and processing by the alert processor of the alert condition to control generation of the external audio alert corresponding to the alert condition.

In various alternative embodiments, the alert condition may be based on a predetermined set of messages being received by the alert processor within a predetermined period of time and/or a predetermined set of messages being received by the alert processor in a predetermined order. The external audio alert may be user-selectable and/or user-programmable. The vehicle may include an alert selection interface coupled to the internal digital communication system to cause generation of an operator-initiated alert message over the internal digital communication system, and pursuant to which the alert processor causes generation of the external audio alert corresponding to the operator-initiated alert message. The alert selection interface may include a plurality of buttons and may be on the steering wheel of the vehicle. The alert processor may cause generation of the external audio alert at a volume level and/or for a duration of time appropriate to the particular alert message and the state of the vehicle. The external audio alert may be proprietary or protected by patent, copyright, or trademark, and may not be used, copied, or modified except by an entity authorized to do so.

In other alternative embodiments, the method may further comprise determining by the alert processor at least one direction for the external audio alert and causing generation of the external audio alert in the at least one direction. The vehicle may include a plurality of audio transducers positioned to generate external audio alerts in different directions, in which case causing generation of the external audio alert in at least one direction may comprise determining a set of audio transducers corresponding to at least one direction and causing generation of the external audio alert by the set of audio transducers. Additionally or alternatively, the vehicle may include a plurality of audio transducers, wherein causing generation of the external audio alert in at least one direction comprises causing generation of the external audio alert by the audio transducers with different delay and/or phase.

In other alternative embodiments, audio alerts may be used to communicate with entities in the vicinity of the vehicle, e.g., other vehicles or roadside devices. Thus, for example, the method may further comprise processing by the alert processor to cause creation of a digitally encoded message intended to be transmitted to and received by one or more entities in the vicinity of the vehicle; processing by the alert processor to modulate an external audio alert, within an audible or non-audible (e.g., ultrasonic) frequency spectrum, with a digitally encoded message; and processing by the alert processor to cause generation of the external audio alert, modulated with a digitally encoded message to other entities, corresponding to the alert condition. Inter-vehicle communications may be particularly useful in the context of "intelligent" or autonomous vehicles for conveying information about impending actions, e.g., informing surrounding vehicles and/or drivers, bicyclists, or pedestrians of an impending lane change or aggressive braking maneuver.

Without limitation, some specific examples of audio alerts include generation of the external audio alert corresponding to "WATCH OUT—INEFFECTIVE BRAKES" upon detecting an alert condition of ineffective brakes; generation of the external audio alert corresponding to "WATCH OUT" in order to warn others in front of the impacted vehicle upon detecting an alert condition of VEHICLE HAS BEEN IMPACTED FROM BEHIND; and generation of the external audio alert corresponding to "WATCH OUT" upon detecting an alert condition of POTENTIAL IMPACT WITH PEDESTRIAN OR OTHER OBSTACLE.

In accordance with another embodiment of the invention, an alert controller for producing an external audio alert for use in the course of operation of a motor vehicle comprises an alert processor and a bus node interface for connecting the alert processor to an internal digital communication system used to control or monitor at least a motor of the vehicle, wherein the alert processor is configured to perform computer processes comprising processing messages from the internal digital communication system to characterize a current state of the vehicle; processing of the current vehicle state to determine whether an alert condition is present; and processing of the alert condition to control generation of the external audio alert corresponding to the alert condition.

In various alternative embodiments, the alert condition may be based on a predetermined set of messages being received by the alert processor within a predetermined period of time and/or a predetermined set of messages being received by the alert processor in a predetermined order. The external audio alert may be user-selectable and/or user-programmable. The alert processor may determine at least one direction for the external audio alert and cause generation of the external audio alert in the at least one direction. Controlling generation of the external audio alert may involve controlling generation of the external audio alert at a volume level appropriate to the particular alert message and the state of the vehicle and/or controlling generation of the external audio alert for a duration of time appropriate to the particular alert message and the state of the vehicle.

In accordance with another embodiment of the invention, an acoustic signaling system for use in a vehicle having an engine and an internal digital communication system for controlling at least the motor comprises an acoustic driver, mounted to direct an audio output away from the vehicle; an amplifier, coupled to the acoustic driver; an alert controller coupled to the amplifier and to the digital communication system, the controller executing a program to retrieve a stored customizable and selectable sound file from among a plurality of stored sound files; and an alert selection interface, coupled to the digital communication system, and configured to cause the controller to play over the amplifier and acoustic driver a user-selected sound file.

In various alternative embodiments, the controller may include non-volatile storage configured to store a plurality of sound files, the system may further comprise an IO interface configured to receive an externally provided sound file, and the controller may be configured to store the externally provided sound file in the non-volatile storage. The IO interface may be user accessible. The alert selection interface may include a plurality of buttons and may be on the steering wheel of the vehicle.

In accordance with another embodiment of the invention, an acoustic signaling device for use in a vehicle comprises an array of acoustic drivers; an array of amplifiers, each amplifier of the amplifier array coupled to a corresponding driver in the array of the drivers; an array of signal processors, each signal processor of the signal processor array coupled to a corresponding amplifier in the array of amplifiers; and a signal source coupled to the array of signal processors, the signal source producing a signal in an audible frequency range for human hearing, wherein (i) each signal processor in the signal processor array is configured to provide an output that differs in delay from a time reference by a specified amount for such signal processor and (ii) the delay for such signal processor (which may be adjustable) is configured so that sound emanating from the array of acoustic drivers is steered in a desired direction.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIG. 3B is a continuation of the FIG. 3A flow chart;

FIG. 4 is an illustration of how the Alert Selection Interface may be implemented, in accordance with several of the embodiments of the present invention;

FIGS. 5, 6, 7, 8, 9A, 9B, and 10 describe the implementation of a generic embodiment of the system, which enables a message or set of messages to be observed on the internal vehicle communication bus, and consequently used to trigger specific alert behaviors.

FIGS. 11-18 include Tables 1 through 8, which are portions of a sample lookup table referenced in FIG. 3A.

DETAILED DESCRIPTION OF SPECIFIC EMBODIMENTS

Definitions

Figure 1:
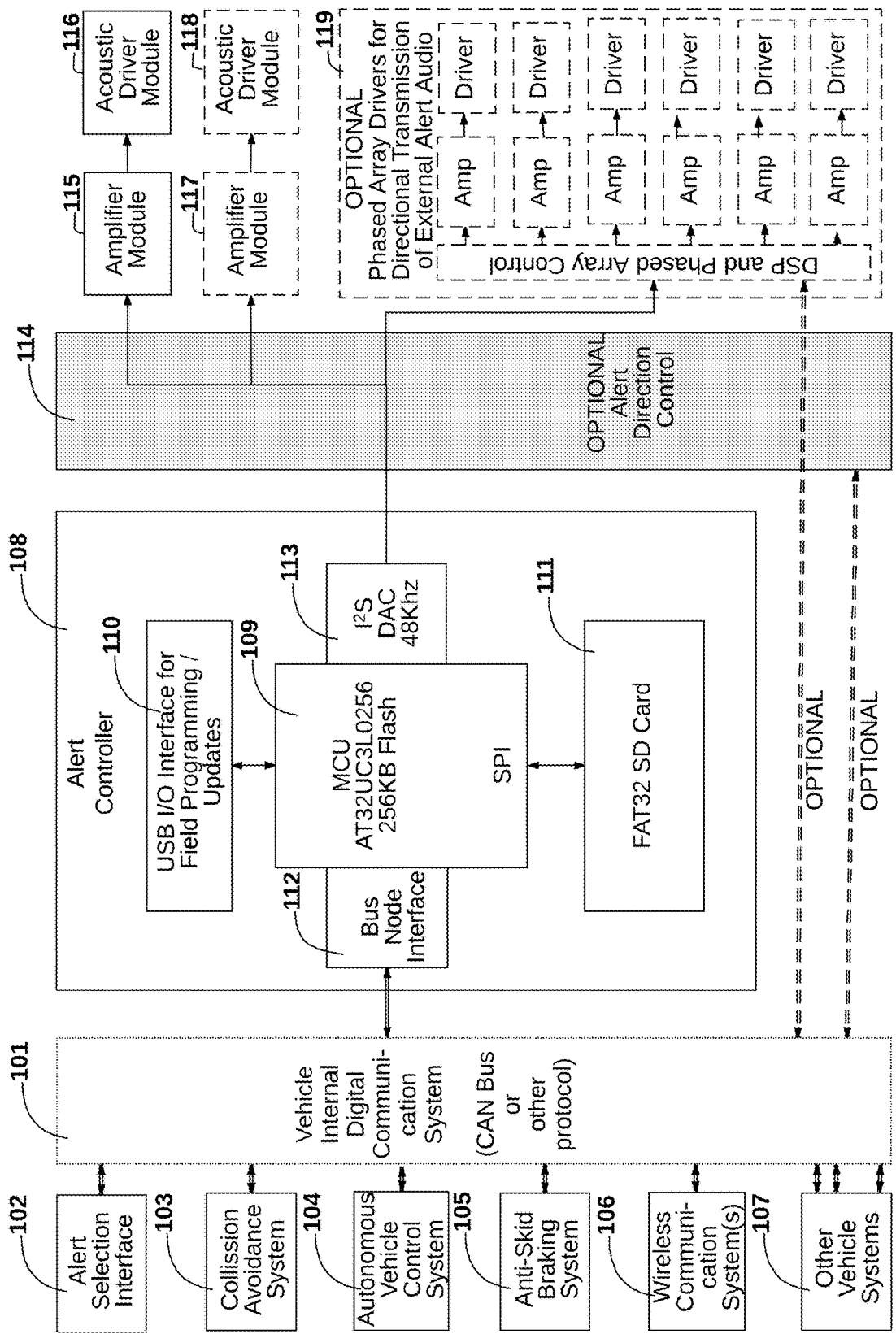
FIG. 1 is a high-level block diagram of an embodiment of the present invention.

As used in this description and the accompanying claims, the following terms shall have the meanings indicated, unless the context otherwise requires:

A "sound file" is a digital representation of an audio signal.

An "internal digital communication system" (IDCS) for controlling and/or monitoring at least the motor in a vehicle may be implemented by a Controller Area Network (CAN) bus, Ethernet, User Datagram Protocol (UDP), wireless protocol, and/or any other communication system or protocol. The communication system may operate in a multiplexed mode sharing a common cable for distinct communication paths or otherwise. The IDCS typically, but not necessarily, includes a headend unit.

The "motor" in a vehicle is either an electric motor or an internal combustion engine, or a combination of an electric motor and an internal combustion engine, used to supply locomotive power to the vehicle, e.g., to one or more wheels, tracks, propellers, etc. It should be noted that a vehicle may have multiple motors controlled and/or monitored via the IDCS (e.g., separate electric motors driving separate wheels or propellers of a vehicle such as an electric car or drone).

A "set" includes at least one member.

A "signal processor" is a device that processes an audio signal, such as from a signal source. A signal processor may vary one or more parameters associated with the audio signal, such as volume and/or directionality (e.g., by varying phase or delay such as for output by an acoustic array or for beam forming or beam steering).

A "signal source" is a device that provides an audio signal, such as from a sound file, to be output by one or more acoustic drivers. The audio signal provided by the signal source may be modified (e.g., amplitude, duration, etc.) prior to being output by the one or more acoustic drivers.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. Using the term "computer process" does not necessarily connote the requirement of a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "audio" alert or signal may be audible or non-audible (e.g., ultrasonic), and/or verbal or non-verbal.

A motor vehicle is "in the course of operation" if an alert controller coupled to the system bus of the vehicle is executing at least one computer process. Thus, for example, within this context, a vehicle can be in the course of operation even when the engine is off and the vehicle is not occupied.

An "alert" generated by a vehicle in accordance with an embodiment of the present invention is an audio indication made for communication, outside of the vehicle, of a condition associated with the vehicle that is pertinent to at least one member selected from the group consisting of individuals, animals, autonomous vehicles, autonomous machinery, and combinations thereof. An alert can, but need not necessarily, be a warning. An alert is typically, but not necessarily, audible.

An alert controller is "coupled" to an IDCS if or when the alert controller is able to send or receive messages over the IDCS. The alert controller can be coupled to the internal digital communication system by wired (including copper, optical, etc.) and/or wireless communication connections. The alert controller may be the IDCS headend unit or may be separate from the IDCS headend unit. The alert controller may perform a "snooping" function by processing messages received over the IDCS (e.g., to determine vehicle status and other events) even when such messages are not addressed or otherwise destined for the alert controller. Thus, for example, the alert controller may detect and process window control messages sent from a headend unit to a window controller to determine whether the window is open or closed.

An "alert selection interface" is a structure in the vehicle including one or more buttons by which the vehicle operator manually initiates generation of external audio alerts. The alert selection interface can include multiple buttons corresponding to different external audio alerts.

A "button" is a user interface to a system by which a user can make a manual selection of an item to be enabled by the system. A button can be implemented as a touch pad or a touch screen (e.g., as a soft key), a switch or switch array, a voice control interface, or other sensor configuration that can detect a specified operator activity (including, for example, a proximity sensing system or motion detection system). A button can be implemented, but by no means must be implemented, by a pressure switch.

A vehicle "state" at a particular point in time is a set of parameters, characterizing attributes of the vehicle at that point in time, including, but not limited to, the vehicle's wheel speeds, speed relative to the ground, position of the steering wheel, motor speed, motor temperature, other motor parameters, position of driver input controls such as pedals, buttons and/or knobs, direction of travel, geographic location, positions of doors, positions of windows, position of sunroof, number of passengers occupying the vehicle, status of systems such as headlights, windshield wipers, air bag, blind spot detection system, lane change assist system, traction control system, tire-pressure monitoring system, backup warning system, pothole detection system, time of day, environmental conditions such as visibility, precipitation, internal and/or external temperature, traffic conditions/conflicts and obstructions, etc. The current vehicle state may take into account the recent set of previous vehicle states (e.g., the vehicle state may depend on a previous context—for example, distinguishing between the brakes being applied when the vehicle has been idling and then shut off versus the brakes being applied when the car was accelerating at full throttle but the vehicle is now "idling" but traveling at 90 MPH).

In embodiments of the present invention, a vehicle's Alert Controller coupled to an IDCS monitors vehicle states based on messages received over the IDCS and generates audio alerts projected external to the vehicle based on the vehicle states. Multiple vehicle states may be defined, with each vehicle state associated with receipt of one or more types of messages in a particular sequence and/or within a particular timeframe. Different audio alerts may be assigned to different vehicle states. The audio alerts may be customizable such as by the vehicle manufacturer and/or vehicle owner/operator. An alert selection interface may be provided in the vehicle for user-selection of audio alerts.

The Alert Controller can be a separate device that is coupled to the IDCS, or the Alert Controller functions described herein can be implemented in another vehicle component such as, for example, a master vehicle controller module that handles other intelligent functions within the vehicle, such as engine spark advance, automatic headlight dimming, and/or seat position memory (in which case such vehicle component would be an Alert Controller for purposes of the invention as described and claimed).

In a first embodiment of the invention there is provided a method to monitor messages traveling via the vehicle's IDCS. The vehicle's IDCS may utilize a CAN Bus, Ethernet, UDP, wireless protocol, or any other communication system or protocol. An Alert Controller is connected to the vehicle's IDCS via its Bus Node Interface, which is programmed to filter and act only on those messages relevant to its function as an external audio alerting system. Those relevant messages are utilized as input to a Microcontroller Unit (MCU), which is programmed to be able to select from among a plurality of different external audio alert signals (stored as digital audio files within the Alert Controller) and initiate playback of the correct one of them in order to communicate the desired message to those within hearing range outside the vehicle. Messages transmitted via the IDCS from various systems within the vehicle are monitored and interpreted by the MCU's program logic in order to update and maintain information related to the current state of the vehicle, and that current status is also utilized as input to the MCU's program logic in order to further inform the selection and transmission of the appropriate external audio alert. Examples of messages that relate directly to the current state of the vehicle are messages containing information about the current speed of the vehicle (transmitted from a wheel speed transducer module) and messages containing information about the current geographic location of the vehicle (transmitted from a GPS-based navigation module). In this embodiment, a Driver-Initiated Alert Selection Interface consisting of several labeled buttons is located at a convenient location on the vehicle's steering wheel. When the driver presses one of the buttons on the Alert Selection Interface, that interface encodes a message containing information as to which button was selected and sends that message via the vehicle's IDCS. The Bus Node Interface within the Alert Controller recognizes that message and uses the information received—along with information it has collected about the current state of the vehicle—as input to its program, which causes it to select the appropriate audio file that has been stored on a programmable non-volatile memory card (for example, an SD Card). The MCU begins playback of the appropriate audio file, so that an analog audio signal is produced via the connected Digital-to-Analog Converter (DAC). That audio signal is sent via hardwire audio cable to an Amplifier Module located within the engine compartment, which increases the power level of the audio sound wave significantly, using power from the vehicle's battery. That relatively high power level output sound wave is fed by hardwire cable to a dust-resistant water-resistant Acoustic Driver Module, capable of converting the electronic sound wave to a high Sound Pressure Level audible alert sound wave which can be easily heard outside the vehicle. When the driver releases the button on the Alert Selection Interface, that interface then encodes a different message containing information that the button has been released, and it sends that "button released" message via the vehicle's IDCS. The Bus Node Interface recognizes that message and passes it on to the MCU, where its program causes the audio file to stop playing.

In a related embodiment, the Bus Node Interface within the Alert Controller recognizes the message that was sent by the Driver-Initiated Alert Selection Interface and uses the information received as input to its program without regard to, and without the necessity of, other information about the state of the vehicle. Detection of the message causes it to select the appropriate audio file that has been stored in a memory device. The MCU then begins playback of the appropriate file as described in the previous embodiment.

In a related embodiment, messages on the IDCS sent from the vehicle's wheel speed transducer module are received and interpreted by the Alert Controller in order to maintain information about the current speed of the vehicle. Then, when a message is received that causes the Alert Controller to select and begin playback of an appropriate external audio alert, the volume level of that audio alert will be determined based on the speed of the vehicle. For example, if the vehicle is traveling less than 40 mph, the external audio alert may be transmitted at a lower volume level than if the vehicle is traveling at a speed greater than 40 mph.

In a related embodiment, messages on the IDCS sent from the vehicle's GPS-based navigation system are received and interpreted by the Alert Controller in order to maintain information about the current geographic location of the vehicle. Then, when a message is received that causes the Alert Controller to select and begin playback of an appropriate external audio alert, the volume level of that audio alert will be determined based on the location of the vehicle. For example, if the vehicle is traveling within a residential neighborhood, the external audio alert may be transmitted at a lower volume level than if the vehicle is traveling on a highway or in a rural area.

In a related embodiment, the vehicle's Collision Avoidance System initiates messages on the IDCS that are relevant to the Alert Controller controlling the external audio alerts. The program within the MCU interprets these messages, along with other messages by which it maintains its vehicle state. If the program logic determines a situation with a high potential for a collision (for example an object crossing in front of the vehicle while the vehicle is traveling at a relatively high speed), the Alert Controller initiates transmission of the appropriate external audio alert warning message.

In a related embodiment, systems within a fully-autonomous or partially-autonomous vehicle initiate messages on the IDCS that are relevant to the Alert Controller controlling the external audio alerts. The program within the MCU interprets these messages, along with other messages by which it maintains its vehicle state, in order to initiate transmission of the appropriate external audio alert message without input from a human driver.

In a related embodiment, systems and modules in the vehicle related to its Anti-Skid or Anti-Lock Braking System initiate messages on the IDCS that are relevant to the Alert Controller controlling the external audio alerts. The program within the MCU interprets these messages, along with other messages by which it maintains its vehicle state (such as the GPS-determined speed of the vehicle), in order to initiate transmission of the appropriate external audio alert message. An example would be encountering a road surface situation in which the vehicle is not achieving adequate braking, and therefore its trajectory is not under effective control of the driver or the vehicle's autonomous driving control system.

In a related embodiment, systems or individuals outside the vehicle communicate with the vehicle via wireless technology (such as cellular, satellite, or other technology). A wireless communication system within the vehicle receives those communications and initiates messages on the IDCS that are relevant to the Alert Controller controlling the external audio alerts. The program within the MCU interprets these messages, along with other messages by which it maintains its vehicle state, in order to initiate transmission of the appropriate external audio alert message.

In a related embodiment, other systems within or outside the vehicle initiate messages on the IDCS that are relevant to the Alert Controller controlling the external audio alerts. Examples include, but are not limited to, the vehicle's security/anti-theft system, the vehicle's supplemental restraint (air bag) system, and the vehicle's passenger entertainment system. The program within the MCU interprets these messages, along with other messages by which it maintains its vehicle state, in order to initiate transmission of the appropriate external audio alert message.

In a related embodiment, a plurality of Acoustic Driver Modules are installed on the vehicle in a configuration that allows for directing the acoustic energy of the external audio alert signal in the direction(s) that would be most effective for communicating to the desired party(ies), while reducing the acoustic energy in the non-desired directions. Messages placed on the IDCS may include information that allows the MCU's program to intelligently choose the direction(s) to which the alert should be transmitted. The program within the MCU interprets these messages, along with other messages by which it maintains its vehicle state, in order to initiate transmission of the appropriate external audio alert signal in the appropriate direction(s). For example, a sound pattern associated with a backup alert may be sent only to the rear of the vehicle.

In a related embodiment, messages initiated on the IDCS may include information which, along with other messages by which it maintains its vehicle state, allows the MCU to determine that it should adjust the volume level of an external audio alert signal so the volume level increases or decreases over time. This would allow for an external audio alert to start out at a relatively low level, but increase over time if the desired result is not initially achieved with the lower volume level. For example, an external audio alert signal may be initially transmitted at a relatively low level, in order to minimize noise pollution. But the level may increase over time if the desired result is not achieved.

In a related embodiment, a simplified program may be implemented within the Alert Controller, which serves to initiate and control external audio alerts based on messages received on the IDCS, but without regard to the state of the vehicle.

In a related embodiment, one or more of the sound files stored within the Alert Controller for external audio alerts may represent unique and/or proprietary sound patterns specific to the brand of vehicle in which it is operated. In this embodiment, the stored file may be encrypted, or access to it may be restricted, such that a digital key is required for playback.

In a related embodiment, the program within the MCU may interpret messages transmitted from other modules on the IDCS, along with messages by which it maintains its vehicle state, in order to generate binary data intelligently to be embedded into an external audio alert, such as to communicate information to other vehicles. Such vehicle-to-vehicle communication typically would use inaudible (e.g., ultrasonic) audio alerts. Such inaudible audio alerts may be produced from the same acoustic driver(s) used to produce audible alerts or may be produced using separate ultrasonic transducers if needed. That inaudible data communicated to other vehicles could include the transmitting vehicle's location, speed, type, size, and intentions, and could be transmitted simultaneously with—or separately from—an audible external alert, by modulating an audio signal in the ultrasonic frequency band. The information could be used by the receiving vehicle for a variety of purposes, including informing its driver of the presence and intentions of an approaching emergency vehicle, or avoidance of a collision. Thus, vehicles may include one or more receivers capable of receiving such inaudible audio alerts and communicating the inaudible data to other vehicle systems, e.g., via the IDCS.

FIG. 1 is a high-level block diagram of an embodiment of the present invention. As shown in FIG. 1, the vehicle's IDCS 101 is connected with one or more systems within the vehicle, possibly including a Driver-Initiated Alert Selection Interface 102, a Collision Avoidance System 103, an Autonomous Vehicle Control System 104, the Anti-Skid Braking system 105, a Wireless Communication System 106, and/or other vehicle systems 107. These vehicle systems send, receive, and monitor messages on the IDCS according to a standardized protocol (for example the CAN bus or CAN-FD bus protocol) to allow the various systems to communicate with each other.

An Alert Controller 108 includes a Microcontroller/MCU 109, USB I/O Interface 110, FAT32 SD Card 111, Bus Node Interface 112, and Digital-to-Analog Converter (DAC) 113. The MCU may be implemented using an Atmel AT32UC3L0256 device, which offers 32-bit processing and 256 KB of flash storage to implement rights management of alert sounds and playback of a digital PCM waveform. The MCU 109 may be programmed or reconfigured via the USB I/O Interface 110.

An attached SD Card 111 allows the vehicle manufacturer and/or the vehicle owner or operator to store sound files associated with the alert system. The manufacturer or owner/operator may simply insert a programmed SD card to install new sound files. The process of creation of the audio files and downloading them to an SD card is relatively simple, and relies only on commonly used methods for such activities. Audio can be recorded and converted to a standard mp3 audio encoded format by any of a multitude of currently available hardware and software configurations. Once the files are created, they can be copied simply to a standard Secure Digital (SD) non-volatile memory card, using an industry standard file structure. This process requires no special knowledge or equipment, other than that typically possessed by anyone familiar with copying files to and from removable disk drives on personal computers. Sound files stored on the SD Card 111 may also be updated by connecting a computer directly to the USB I/O interface 110. Or, if utilizing an IDCS standard such as CAN FD that offers support for data fields large enough to represent encoded audio files, the sound files may be updated over the IDCS 101.

A Bus Node Interface 112 appropriate to the vehicle's IDCS protocol (e.g. CAN Bus) allows the MCU 109 to monitor and/or receive communications from any of the systems or modules connected to the IDCS 101, and optionally to send information to other devices on the bus. A Digital to Analog Converter (DAC) 113 is interfaced to the MCU 109 to provide audio output. It may utilize the $I^2S$ serial audio protocol, clocked at 48 KHz to provide high quality analog audio output. A 25 watt power Amplifier Module 115 is connected to the DAC 113 to provide power to drive an acoustic driver. An Acoustic Driver Module 116 with IP67 environmental rating and 134 db sensitivity provides relatively high sound pressure level (SPL) for alert sounds.

Optionally, in order to provide the ability to direct the external audio alert acoustic energy in specific directions around the vehicle, Alert Location Selection Control circuitry 114 may be implemented with multiple Amplifier Modules 115, 117, 119 driving multiple Acoustic Driver Modules 116, 118, 119. The optional Alert/Location Selection circuitry 114 may receive its location selection control instructions by way of being connected to the IDCS 101. The directionality function may be achieved by routing the audio to only certain amplifier/acoustic driver combinations, or by use of more sophisticated methods such as digital signal processing and phased arrays of acoustic driver modules 119. While only eight Amplifier/Driver systems are shown in FIG. 1, any number may be utilized to achieve the desired functionality of this optional directionality feature.

Figure 2:
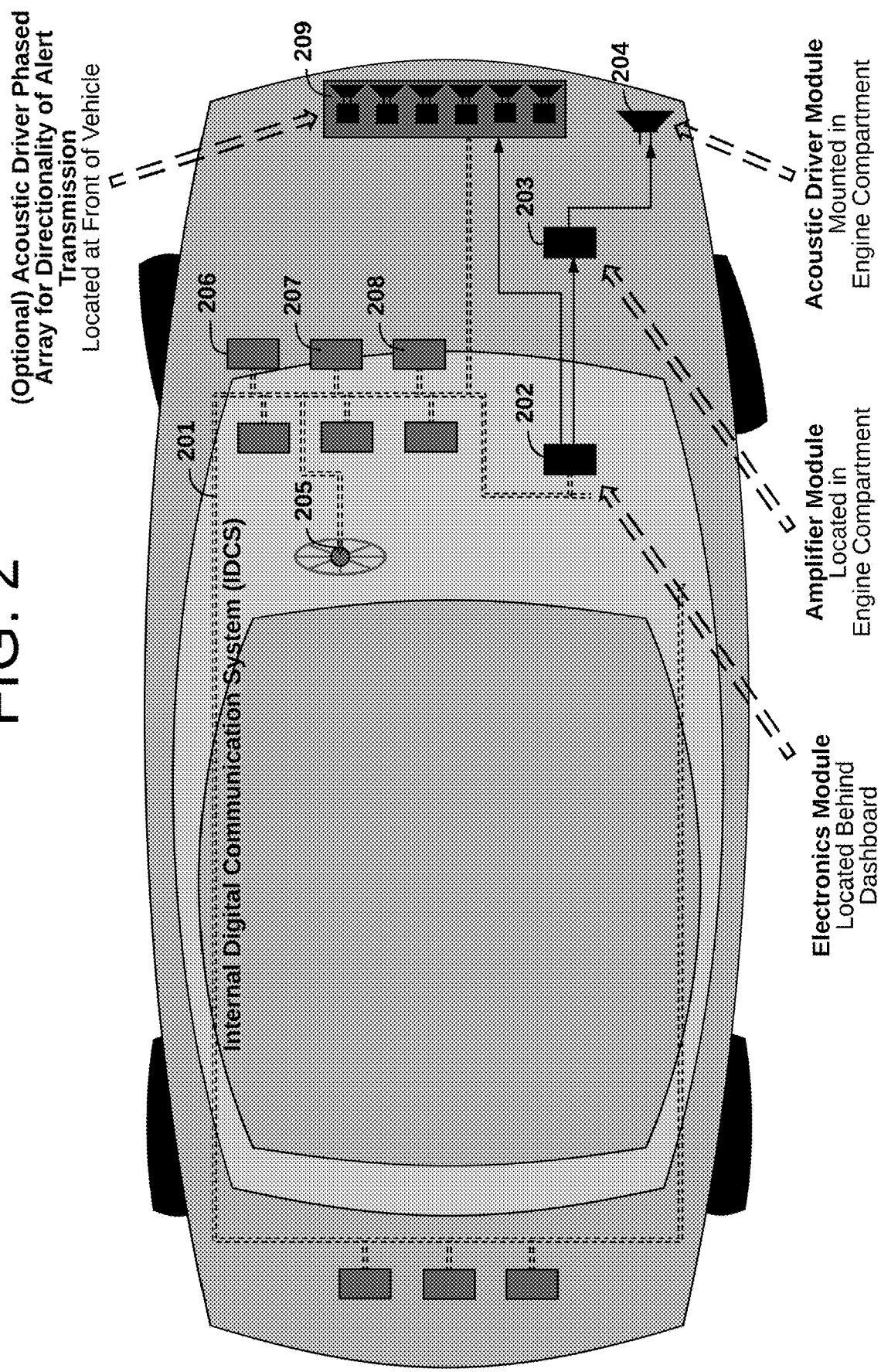
FIG. 2 is a diagram showing an example of where within the vehicle the various components of the embodiment of FIG. 1 may be located.

FIG. 2 is a diagram showing an example of where within the vehicle the various components of the embodiment of FIG. 1 may be located. The Alert Selection Interface 205 comprises buttons that the driver uses to select one of several alert sounds. It may be conveniently located on the steering wheel. It is connected to the vehicle's IDCS (e.g., CAN Bus) 201 in order to send information to the Alert Controller 202, which may be located behind the vehicle's dashboard so that it may be accessed by a service technician if necessary for removing/inserting the SD card 111 that contains the sound files. The Alert Controller 202 is also connected to the vehicle's IDCS 201 (e.g., CAN Bus), through which it receives information from any of the vehicle systems 205, 206, 207, 208, etc. connected to the IDCS 201. The Amplifier Module 203 may be located in the engine compartment. An Acoustic Driver Module 204 may be mounted in the engine compartment behind the grill, in a location that minimizes acoustic isolation from the outside environment. Optionally, additional amplifier modules and acoustic drivers 209 may be mounted at other locations around the vehicle in order to provide control over direction of the transmission of the acoustic energy.

Figure 3A:
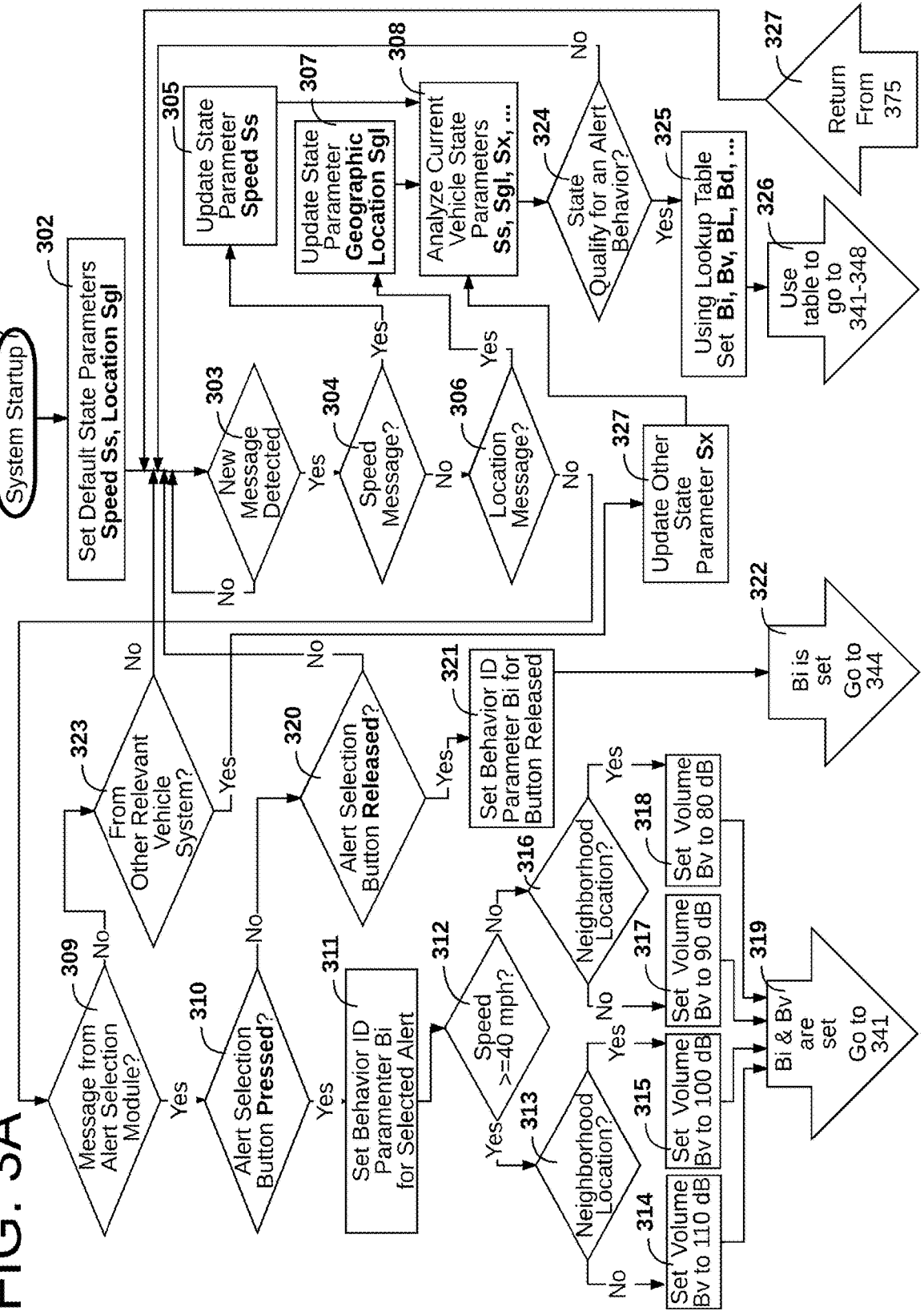
FIG. 3A is a flow chart showing a portion of an example program flow carried out by the Microcontroller Unit (MCU) in accordance with the embodiment of FIG. 1.

FIG. 3A is a flow chart showing a portion of the logic flow of the program implemented by the MCU 109 to provide the functionality described in several of the embodiments mentioned above. Immediately after initialization, which would occur whenever the vehicle electrical system is enabled, the routine begins at the System Startup point 301. If no vehicle speed or geographic location messages have been received from modules on the IDCS, then default values for those state parameters are set (302) into their respective registers for reference as to the vehicle's current state. At startup, a reasonable default value for vehicle speed state parameter Ss would be zero, and a reasonable default value for vehicle geographic location state parameter Sgl may be the geographic coordinates saved from the last time the system was powered down. The logic flow now progresses to 303, where the system waits to detect a new message on the IDCS. When a message is received, decision point 304 determines if the message was one from the wheel speed sensor circuitry indicating the speed of the vehicle has changed.

If the message was, in fact, one indicating the speed of the vehicle, the register containing the vehicle speed state parameter Ss is updated at decision point 305 with the new current value of the vehicle speed. Subsequently, the current state of the vehicle is analyzed based on the set of all of the current state parameters at decision point 308.

If, however, the message was determined at decision point 304 to not be one indicating the speed of the vehicle, then at decision point 306, it is determined if the message was one from the vehicle's navigation system indicating the geographic location of the vehicle. If so, then at decision point 307, the register containing the vehicle's geographic location state parameter Sgl is updated with the new current value for the vehicle's geographic location. At decision point 308, the current state of the vehicle is analyzed based on the set of all of the current state parameters.

If, however, the message was determined at decision point 306 to not be one indicating the geographic location of the vehicle, then at decision point 309, it is determined if the message was one from the vehicle's Alert Selection Interface located on the steering wheel. If the answer is "no", then at decision point 323, it is determined if the message was from any of the other vehicle systems that are relevant to the process of initiating or controlling an external audio alert from the vehicle. If the message is from a vehicle system that is relevant, then the register is updated at decision point 327 to contain the particular state parameter associated with that vehicle system Sx. Subsequently, at decision point 308, the current state of the vehicle is analyzed based on the set of all of the current state parameters.

To this point in the description of the logic flow above, each of the example decisions and actions have eventually led to decision point 308, where the current state of the vehicle is analyzed based on the set of all of the current state parameters. And at this point, at least one message on the IDCS has been detected that is relevant to the process, and at least one parameter in the table of registers has been updated that specify the vehicle's state. It may have been the vehicle speed Ss (updated at decision point 305), or it may have been the vehicle geographic location Sgl (updated at decision point 307), or it may have been one or more other relevant parameters Sx (updated at decision point 327). Now, at decision point 308, the current state of the vehicle is analyzed by comparing the current set of state parameters, via a lookup table, with a set of vehicle states that have been pre-programmed, e.g., by the manufacturer of this device. At decision point 324, if the current state of the vehicle, as defined by the current set of those state parameter registers, matches one of the states within that lookup table, then the program moves to decision point 325 and uses the output of that lookup table to (a) determine which of several behaviors should be initiated and (b) set the appropriate values for the behavioral parameters. Those behavioral parameters may include:

Bi—to represent the ID for a specific sound file to be initiated, terminated, or otherwise controlled.

Bv—to represent the volume at which a sound file is to be played or to which it should be faded.

BL—to represent the location around the vehicle toward which the sound should be directionalized. (For example, to the front, to the rear, 30 degrees to the right of front, etc.) This is applicable in implementations that allow the system to output sound to a specific direction.

Bd—to represent the duration of time (in msec) during which the sound file should be played.

other Behavioral Parameters to be used as input to the control of external sound production Based on that specified behavior, the process continues at decision point 326 to one of the behaviors illustrated in FIG. 3B, at decision point 341, 342, 343, 344, 345, 346, 347, or 348. Those behavior processes are discussed and explained later in this document in the detailed description of that FIG. 3B. If, back at decision point 324, the current state of the vehicle, as defined by the current set of those parameter registers, did not match one of the states within that lookup table, then the program reverts to decision point 303 and waits for another new message to be detected on the IDCS.

The explanation of FIG. 3A to this point has been of the generalized scenario whereby the state of the vehicle is continuously characterized by the values of several state parameters, which are updated as necessary when certain messages are detected on the IDCS. When the vehicle state parameters are seen to match those that have been determined (via a lookup table) to necessitate the initiation or control of an external alert, then the program sets the behavioral parameters and moves to initiate the appropriate behavior. A more specific, simple, and illustrative example is now presented: how a sequence of messages detected on the vehicle IDCS will result in a particular and appropriate external audio alert based on the state of the vehicle. In the examples above, at decision point 309, it was assumed that the message detected was not from the Alert Selection Interface (which is, for this example, a module located on the steering wheel by which the driver may press a button to select a particular sound to be played external to the vehicle). (See FIG. 4.) Now suppose that at decision point 309, it is recognized that the message detected was indeed sent from the Alert Selection Interface. Then, at decision point 310, the message is checked to see if it was to indicate that one of the buttons on that module had been pressed. If so, then at decision point 311, the register containing the behavioral ID parameter Bi is updated with the value representing the location in the SD memory card containing the particular audio file for the sound that the driver selected to be played (i.e., the sound associated with the button the driver pressed). From previous messages, the state parameter Speed Ss (at 305) and the state parameter Geographic location Sgi (at 307) have already been updated.

At decision point 312, a determination is made as to whether to proceed to decision point 313 or 316, depending on whether the current speed state parameter Ss is greater or less than 40 mph. If the speed state parameter Ss is greater than 40 mph, then at decision point 313, the current geographic location state parameter Sgl is assessed to determine whether the vehicle is in a neighborhood. If the vehicle is not in a neighborhood, then the behavioral volume parameter Bv is set at decision point 314 to a very high level, e.g., 110 db. If the vehicle is in a neighborhood, then the behavioral volume parameter By is set at decision point 315 to a not-as-loud level, e.g., 100 db. If, back at decision point 312, it is determined that the vehicle speed state parameter Ss is less than 40 mph, then at decision point 316, the current geographic location state parameter Sgl is assessed to determine whether the vehicle is in a neighborhood. If not in a neighborhood, then the behavioral volume parameter By is set at decision point 317 to a moderate level, e.g., 90 db. If the vehicle is in a neighborhood, then the behavioral volume parameter By is set at decision point 318 to a relatively low level, e.g. 80 db. The net result of the decisions and actions illustrated by decision points 311, 312, 313, 316, 314, 315, 317, and 318, is that when the driver presses a button on the Alert Selection Interface, the external alert sound file that he/she selected is set to be played at a volume level that depends on the vehicle's current speed and geographic location. If the vehicle is going fast (greater than 40 mph in this example), and not in a neighborhood (e.g. on a highway, or in a rural area), then the alert will be loud. If the vehicle is traveling slowly (less than 40 mph in this example), and in a neighborhood, then the alert will be transmitted at a significantly lower level, e.g., to reduce noise pollution.

In the example above, it was determined at 309 that the message was from the Alert Selection Interface. Then at 310, it was determined that the message indicated that the driver had pressed one of the buttons on that interface. Another possibility is that the message from the Alert Selection Interface was not one that indicated a button press, but rather was a message indicating that a button had been released. That is, the driver had previously pressed a button, and has now just released it. In that case, the decision point sequence would be from 310 to 320, and then to 321. Based on the message's information as to which button had been released, at decision point 321, the register containing the behavioral ID parameter Bi is updated, representing the location in the SD memory card containing the particular audio file for the sound that should stop playing. Consequently, through decision point 322, the behavior 344 (see FIG. 3B) is initiated to stop playback of that external alert sound file.

In summary, FIG. 3A illustrates how each time a message is detected on the IDCS, sent from any system or module attached to the IDCS, and intended to be received by any module attached to the IDCS, that message is interpreted by this device to determine if it contains information relevant to the function of initiating and/or controlling external alert sounds. If the message is relevant, then, depending on the message type and its contents, certain memory registers are updated within the device to maintain information about the current state of the vehicle. A lookup table is then used to compare the current vehicle state parameters with a list of pre-programmed sets of vehicle state parameters to determine if a behavior should be initiated to control playback of an external audio alert signal.

FIG. 3B is a continuation of the flow chart from FIG. 3A, that illustrates the eight sample behaviors that may be initiated based on the program flow described above for FIG. 3A. The behaviors' functions are dependent on behavioral parameters determined in that program flow, via the lookup table at 325, including but not limited to those behavioral parameters discussed above (sound file ID Bi, volume By, directional location BL, sound duration Bd, etc.)

The following sample behaviors are shown:

Play Complete Sound File with ID Bi, VOLUME By, LOCATION BL

Play Timed Sound File with ID Bi, VOLUME By, LOCATION BL, DURATION Bd

Fade Sound File with ID Bi, VOLUME By, DURATION Bd

Stop Sound File with ID Bi

Stop All Sounds

Configure Sound File lookup with position ID Bi, FILENAME f

Load File with DATA d, FILENAME f (only for CAN FD and UDP implementations), where DATA is sent to the device over the IDCS to store a new sound file under FILENAME on internal storage)

Store Private Key with KEY k

Where KEY is a cryptographic key used to enable sounds which have been encrypted by vehicle manufacturers.

If the "Play Complete Sound File" behavior has been selected, then the logic continues at 353. At 354 the program uses the ID Bi to select the appropriate sound file stored in the onboard SD card 111. If the optional feature is available that offers the ability to direct the external audio alerts in specific directions from the vehicle, then at 355 the MCU 109 will instruct the Bus Node Interface 112 to send a message to the Alert Location Selection Control 114 and/or the Amplifier/Driver Phased Array Directional Control 119, to select the appropriate amplifiers and acoustic driver modules based on the behavioral directional location parameter BL. At 356, the MCU 109 initiates playback of the complete sound file at volume level By. The process then immediately returns via 375 and 327 to 303, where it waits for another message to appear on the IDCS.

If the "Play Timed Sound File" behavior has been selected, then the logic continues at process 357. At 358 the program uses the ID Bi to select the appropriate sound file stored in the onboard SD card 111. If the optional feature is available that offers the ability to direct the external audio alerts in specific directions from the vehicle, then at 359 the MCU 109 will instruct the Bus Node Interface 112 to send a message to the Alert Location Selection Control 114 and/or the Amplifier/Driver Phased Array Directional Control 119, to select the appropriate amplifiers and acoustic driver modules based on the behavioral directional location parameter BL. At 360, the MCU 109 initiates playback of the sound file at volume level By for the duration Bd. The process then immediately returns via 375 and 327 to 303, where it waits for another message to appear on the IDCS.

If the "Fade Sound File" behavior has been selected, then the logic continues at process 361. At 362 the program will check to determine if the particular sound file represented by Bi, that it has been instructed to fade, is currently playing. If it is not, then the behavior requested is not necessary, and the process immediately returns via 375 and 327 to 303, where it waits for another message to appear on the IDCS. If the sound file Bi, that it has been instructed to fade, is indeed currently playing, then at 363 the MCU 109 utilizes the behavioral parameter Bd to calculate the required fade rate and adjusts the playback amplitude in order to accomplish the necessary volume adjustment. The process then immediately returns via 375 and 327 to 303, where it waits for another message to appear on the IDCS.

If the "Stop Sound File" behavior has been selected, then the logic continues at process 364. At 365 the program will check to determine if the sound file Bi, that it has been instructed to stop, is currently playing. If it is not, then the behavior requested is not necessary, and the process immediately returns via 375 and 327 to 303, where it waits for another message to appear on the IDCS. If the sound file Bi, that it has been instructed to stop, is indeed currently playing, then at 366 the MCU 109 stops playback of that sound file. The process then immediately returns via 375 and 327 to 303, where it waits for another message to appear on the IDCS.

If the "Stop All Sounds" behavior has been selected, then the logic continues at process 367. At 368 the MCU 109 stops playback of all sound files currently being played back. The process then immediately returns via 375 and 327 to 303, where it waits for another message to appear on the IDCS.

If the "Configure Sound File" behavior has been selected, then the logic continues at process 369. Based on the contents of the message monitored or received from the IDCS 101 and the lookup table at 325, the program logic will have determined the appropriate sound file ID (Bi) and the filename (Bf) of the file stored in the SD card 111 which should be associated with that file ID (Bi). At 370 the MCU 109 will configure its internal file directory to associate that file ID (Bi) with the filename (Bf). The process then immediately returns via 375 and 327 to 303, where it waits for another message to appear on the IDCS.

If the "Load Sound File" behavior has been selected, then the logic continues at process 371. Based on the contents of the message monitored or received from the IDCS 101 and the lookup table at 325, the program logic will have determined the specific filename (Bf) of a file to be stored in the SD card 111 and will have received the encoded audio file data (Bd) that should be stored on the SD card 111 at the memory location associated with that filename (Bf). Note that this capability is only available with IDCS protocols such as CAN FD that offer support for data fields large enough to represent encoded audio files. At 372 the MCU 109 stores the encoded audio file data (Bd) on the SD card 111 at the memory location associated with filename (Bf). The process then immediately returns via 375 and 327 to 303, where it waits for another message to appear on the IDCS.

If the "Store Private Key" behavior has been selected, then the logic continues at process 373. Based on the contents of the message monitored or received from the IDCS 101 and the lookup table at 325, the program logic will have determined the specific cryptographic key (Bk) that should be stored. At 374 the MCU 109 stores the cryptographic key (Bk) within the Alert Controller in order to allow playback of encrypted sound files. The process then immediately returns via 375 and 327 to 303, where it waits for another message to appear on the IDCS.

FIG. 4 illustrates an example of how one aspect of the system may be implemented. This is the Alert Selection Interface, discussed in FIG. 1 as element 102, in FIG. 2 as element 205, and in FIG. 3A in decision points 309, 310, and 320. It also shows an example of where the Alert Selection Interface may be located and how it communicates information to the other modules within that embodiment. The Alert Selection Interface 401 includes a set of buttons, which the driver uses to select one of several alert sounds. The interface is conveniently located on the steering wheel, in a location where a driver would normally expect to find a traditional horn button. Examples of the types of messages the driver may intend to communicate to those outside the vehicle by means of an selected audio sound include: "Standard" alert 402, to indicate a default alert sound, "I'm Here" 403 to get the attention of someone expecting the driver to show up, "Look At Me!" 404 to get the attention of someone who needs to see the vehicle or the driver and what it or he/she is doing, "Bye Bye" 405 to send a friendly message when departing from a social event, and "Wake Up" 406 to get the attention of another driver who hasn't noticed that the light has changed or some other action or activity of which he/she needs to be aware. 1. When one of the alert selection buttons 402, 403, 404, 405, or 406 is pressed, a contact is closed behind that button for as long as the user holds the button. That contact closure is sensed by the CAN Bus Node I/O Interface 407 (or some other communication bus protocol used in that particular vehicle model) which sends messages to the Alert Controller 108 via the internal digital communication system, indicating which button has been pressed. Each push button 402, 403, 404, 405, or 406 provides a contact closure for as long as the driver holds that button down. When one of the contact closures occurs, the CAN Bus node I/O interface module 407 transmits a message to the Alert Controller 103 via the CAN Bus. By this method, the Alert Controller 103 can determine that an alert button is being pressed, and which button it is. That information is used as input to its program flow (see FIG. 3A, 310), and used to determine whether to play an audio file, and which audio file to play. When that alert selection button is released, the removal of the contact closure is sensed by the CAN Bus Node I/O Interface 407, and a message is sent via the IDCS to indicate that the button has been released. That information is used as input to the program flow (see FIG. 3A, 320), resulting in a behavior that stops playback of the audio.

FIGS. 11-18 include Tables 1 through 8, which are portions of a sample lookup table. That lookup table is referred to above in the discussion of FIG. 3A, and specifically the decision points 324 and 325 where the vehicle's current state parameters are examined and compared with those in said lookup table to determine if the current state of the vehicle necessitates an action to initiate or control an external audio alert. This sample lookup table portion is helpful in understanding how various vehicle state parameters may be matched with a set of pre-programmed values in order to trigger the selection of certain behaviors and the corresponding behavior parameters. In Tables 1 through 8, various systems and/or sensors within the vehicle that send messages via the IDCS are listed as rows, along the left side of the table. These systems and sensors may send messages that characterize the state of various systems and sensors. In this example, the following state parameters are shown:

Ss represents the wheel speed, detected by a wheel speed sensor, and from which the presumed speed of the vehicle can be calculated.

Sgl represents the geographic location of the vehicle, determined by the vehicle's GPS-based navigation system. It may be expressed in terms of latitude and longitude or some other geographic reference system. From that data, along with information maintained by the vehicle's navigation system, certain characteristics of the location of the vehicle may be determined, such as urban, rural, residential neighborhood, commercial area, industrial area, highway, park, etc.

Sx1 through Sx14 represent state parameters for various other systems and sensors throughout the vehicle. This is by no means a comprehensive list of all state parameters, but rather a representative list to offer examples by which the reader may understand the types of messages and vehicle state parameters that may be detected and utilized to detect combinations that result in the triggering of behaviors to initiate and control the playback of external audio alert sound files.

The columns of the sample lookup table in each of Tables 1 through 8 represent examples of various combinations of the vehicle state parameters that, when such combinations are detected, may trigger a specific behavior, and optionally certain behavior parameters to further characterize those output behaviors. The examples shown are not intended to be a comprehensive list of all possible relevant combinations of state parameters, but rather a representative list to offer examples by which the reader my understand the types of vehicle state combinations that may be used to trigger certain external alert behaviors. To assist in understanding the tables, some of the vehicle state parameter combinations and their corresponding scenarios shown are:

Table 1: "Rear Impact"—When the vehicle is impacted from behind by another vehicle, often the vehicle that has been hit will then be forced into another vehicle, object, or pedestrian. It may be helpful if others in the vicinity of the vehicle are warned by a loud "Watch Out" type of sound. That sound could be a digital recording of a voice shouting "WATCH OUT! WATCH OUT!", or some other audio pattern. In this case, if the vehicle's impact sensors send a message via the IDCS indicating that an impact has been recently detected at the rear of the vehicle (e.g. state variable Sx5 is True), AND the vehicle's external proximity sensors have sent a message that another vehicle is within 30 feet in front (e.g. state variable Sx3 is True), then the system will detect a match between the current state parameters and this column of the lookup table. So, as shown in the section at the bottom of Table 1, the program will set behavioral parameter Bi to indicate the sound file "Watch Out" should be played, behavioral parameter By to indicate that it should be played at maximum volume, behavioral parameter BL to indicate the sound should be transmitted to the front of the vehicle, and behavioral parameter Bd to indicate that the sound file should be played for 10 seconds. And the program will be instructed to proceed to the "Play Timed Sound File" behavior, as referenced in 357 of FIG. 3B.

Table 2: "Ineffective Brakes"—Suppose the vehicle is traveling down a steep slope and suddenly enters road conditions where a solid sheet of ice covers the road. The driver steps on the brakes, but because the sheet of ice offers negligible friction to the rubber tires, the vehicles wheels stop turning . . . but the vehicle continues down the hill. This is a skidding condition, and the driver has very little control over the trajectory or speed of the vehicle. It is dangerous to the driver and passengers, but it is also dangerous to other vehicles, objects, and pedestrians in the vicinity of the vehicle. It would be helpful to transmit an audible external warning sound. If the vehicle's wheel speed sensor detects that the wheel speed is zero (e.g. state variable Ss=0), AND the vehicle's GPS-based navigation system has detected that the vehicle has a velocity relative to the earth of more than 2 mph (e.g. Sx1 is greater than 2 mph for at least 2 seconds), then the system will detect a match between the current state parameters and this column of the lookup table. So, as shown in the section at the bottom of Table 2, the program will set behavioral parameter Bi to indicate the sound file "Watch Out—Ineffective Brakes" should be played, behavioral parameter By to indicate that it should be played at maximum volume, behavioral parameter BL to indicate the sound should be transmitted in all directions. And the program will be instructed to proceed to the "Play Complete Sound File" behavior, as referenced in 353 of FIG. 3B.

Table 3: "Braking Control Regained"—Eventually the skidding vehicle described in the preceding paragraph discussion of Table 2 will no longer find itself in that situation where the wheel speed is zero and the ground speed is positive. So at that point it should stop playing the "Watch Out—Ineffective Brakes" sound file. If the wheel speed state parameter Ss matches the GPS-derived ground speed state variable Sx1, then the system will detect a match between the current state parameters and this column of the lookup table. So, as shown in the section at the bottom of Table 3, the program will set behavioral parameter Bi to indicate the sound file "Watch Out—Ineffective Brakes" should be stopped. And the program will be instructed to proceed to the "Stop Sound File" behavior, as referenced in 364 of FIG. 3B.

Tables 4, 5, 6, 7, and 8: Other columns in the sample lookup table shown in Tables 4 through 8 represent examples of other scenarios that may initiate external audio alerts, and they operate similarly to Tables 1, 2 and 3 just described. In each case, if a match is detected between certain vehicle state parameters and a set of parameter values preprogrammed into the system, then a certain behavior is initiated, and certain behavioral parameters are set in order that the external audio alert functions as intended, with regard to the particular sound file, and optionally the volume of the alert sound, the location toward which it is directed, and its duration in time.

Table 4 illustrates the example of the detection of an obstacle nearby in front of the vehicle, along with the driver pressing hard on the brakes. The result is the transmission of a "Watch Out!" alert sound, at maximum volume, directed in front of the vehicle, for a duration of 5 seconds.

Table 5 illustrates the example of a scenario under which the driver of the vehicle has exited the vehicle (as detected by the arming of the vehicle's security system) while the vehicle's rain sensor is detecting active rain on the windshield, and the electric window system is indicating at least one window is still open. The result is the transmission external to the vehicle of a "Ding Ding . . . A window is open and I sense rain" alert sound, at relatively low volume, in all directions, to notify the driver that he/she may want to reconsider leaving the window open under the circumstances.

Table 6 illustrates the example of the driver utilizing an alert selection interface within the vehicle to initiate a specific desired external audio alert. An example of an Alert Selection Interface implementation is shown in FIG. 4, and discussed in this document in the description of FIG. 4. The driver may choose to activate one of the pre-programmed audio alert types, shown in this example as "I'm Here", "Look at Me", "Bye Bye", "Wake Up", etc.

Table 7 illustrates a similar example as in Table 6, except in this case the system also includes the optional functionality which also monitors the vehicle's speed and its geographic location in order to adjust the volume level and/or directionality of the transmitted external audio alert, depending on the speed and location of the vehicle at the time the driver presses one of the Alert Selection Interface buttons.

Table 8 illustrates the example of how the system determines when to stop the transmission of the driver-initiated alert discussed above in reference to Tables 6 and 7. When the driver releases the selected button on the Alert Selection Interface, the system stops playing the sound file.

FIG. 5, FIG. 6, FIG. 7, FIG. 8, FIG. 9A, FIG. 9B, and FIG. 10 describe the implementation of a generic embodiment of the system, which enables a message or set of messages to be observed on the IDCS, and consequently used to trigger specific alert behaviors. The messages on the IDCS are sent from external systems such as engine control, transmission, and safety sensors. They provide the system with a simple means of understanding the state of the vehicle and therefore, when and how it might be appropriate to trigger an alert sound outside the vehicle. The system may be programmed to require the presence of one or more messages that may be, in turn, programmed to trigger one or more alert behaviors.

To achieve this, the system contains one or more lists of messages that may be observed on the IDCS 101, 408—for purposes here, these lists of messages will be referred to as ENTRY LISTS 612. As messages are observed on the IDCS

101, 408, they are compared to each ENTRY LIST 503, 611. The ENTRY LIST specifies a set of messages required to trigger a MACRO 504. A MACRO contains a list of behaviors for the system to execute sequentially 505, such as playing an alert sound. This basic flow is shown in logic in FIG. 5 and as a conceptual diagram in FIG. 10.

With this arrangement, the system's functionality may be completely defined by a set of ENTRY LISTS and a set of MACROS. The ENTRY LISTS and MACROS are field programmable by original equipment manufacturer (OEM) integrators.

An ENTRY LIST 722, 842 may have one of two structures: Ordered FIG. 7 and Unordered FIG. 8. An ordered ENTRY LIST FIG. 7 requires messages to be received in a specific sequence. An unordered ENTRY LIST FIG. 8 does not require messages to be received in a specific sequence.

The system detects both ordered and unordered messages because the order of actions is important to represent the state of the vehicle. For example, to change the gear shift to reverse and then press the brake pedal is not the same as to press the brake pedal and then change to reverse.

At the same time, requiring specific order can be too narrow to recognize more generalized vehicle states. For example, if the engine is turned off, the sun-roof is open, the car is locked, and no passenger is present in vehicle, then this particular complete set of messages—in any order— may cause a warning tone to alert that the sun roof has been left open.

The structure of ordered and unordered ENTRY LISTS 722, 842 are similar. For an ordered ENTRY LIST 722, a pointer 723 is used to keep track of which message should be observed next to complete the list. The unordered ENTRY LIST 842 simply marks each message in the list as observed 843. Both list formats contain timeouts 725, 845 which specifies how close in time the messages must be received before the state of the list is reset 726, 846.

An ENTRY LIST may be as simple as a single message (e.g., a button pushed on the dashboard) or a complex set of messages (accelerator pressed down and vehicle in low gear and external proximity center activated, etc.).

When a message is observed on the IDCS 101, 408 and compared to the ENTRY LISTS 722, 842, the comparison is able to look at a subset of the message, if needed, rather than the entire message. This is useful because messages on the IDCS 101, 408 have hierarchy. The system may watch for "parking brake" message type and look at the value "off" or "on" to determine whether the message matches and should enable 730, 850 the entry list item. For each item in the ENTRY LIST, both "enable" and "disable" messages are defined 730, 850 to accommodate IDCS which do not use hierarchical message formats. The "disable message" for an ENTRY LIST item causes an ordered ENTRY LIST to reset completely 730, and an unordered ENTRY LIST to mark the specific item as unseen 851 without resetting the whole list.

If all messages in an ENTRY LIST 722 are received within a specified timeout 725, 845, then a MACRO is called 727, 847. A MACRO is simply a list 505 of behaviors 961, 962, 963, 964, 965, 966, 967, 968, 969, 970, 971 initiated in a specific order. The MACRO allows the linking of multiple behaviors to a single ENTRY LIST. A MACRO can additionally send a message to the IDCS 101, 408, 969.

An example MACRO would be to play a horn alert, wait five seconds, then play a warning bell.

2. If a message is sent to the communications bus, it may be detected by the system 502 and consequently trigger another ENTRY LIST 503,722. This allows complex control flows to be programmed into the device involving timers 970, 971 and even other devices on the IDCS 101, 408. The processes governing message detection via ENTRY LISTS 612 and the triggering of behaviors via MACROS 505 run asynchronously, so that many of each may be executed simultaneously. A queue is used between processes to prevent race conditions.

FIGS. 9A and 9B describe the complete list of behaviors 961, 962, 963, 964, 965, 966, 967, 968, 969, 970, 971 that may be executed by a macro. Each behavior (with the exception of timer) returns to the MACRO list 505 once completed to execute the next behavior in the MACRO list.

If the behavior has been decoded to be "Play Complete Sound File", then the logic continues at process 961. Based on the content of the message monitored or received from the IDCS 101 and the lookup table, the program logic will have determined the appropriate sound file ID (n), and optionally the appropriate volume level at which the external alert should be played (v), and optionally the specific direction toward which the external alert should be pointed (L). The program uses the ID n listed in the MACRO 505 to select the appropriate sound file stored in the onboard SD card 111. If the optional feature is available that offers the ability to direct the external audio alerts in specific directions from the vehicle, then at 561 the MCU 109 will instruct the Bus Node Interface 112 to send a message to the Alert Location Selection Control 114 to select the appropriate amplifiers and acoustic driver modules. At 961, the MCU 109 initiates playback of the complete sound file at volume level v. The process then immediately returns to the MACRO list, 505 to execute the next behavior in the macro.

If the behavior has been decoded to be "Play Timed Sound File", then the logic continues at process 962. Based on the contents of the message monitored or received from the IDCS 101 and the lookup table, the program logic will have determined the appropriate sound file ID (n), and the duration for which the external alert should be played (d), and optionally the appropriate volume level at which the external alert should be played (v), and optionally the specific direction toward which the external alert should be pointed (L). At 962 the program uses the ID n to select the appropriate sound file stored in the onboard SD card 111. If the optional feature is available that offers the ability to direct the external audio alerts in specific directions from the vehicle, then at 962 the MCU 109 will instruct the Bus Node Interface 112 to send a message to the Alert Location Selection Control 114 to select the appropriate amplifiers and acoustic driver modules. At 962, the MCU 109 initiates playback of the complete sound file at volume level v for the duration d. The process then immediately returns to the MACRO list, 505 to execute the next action in the macro.

If the behavior has been decoded to be "Fade Sound File", then the logic continues at process 963. Based on the contents of the message monitored or received from the IDCS 101 and the lookup table, the program logic will have determined the appropriate sound file ID (n) and the volume (v) to which the amplitude of the sound file should be gradually increased or gradually attenuated over the time period (d). At 963 the program will check to determine if the sound file that it has been instructed to fade is currently playing. If it is not, then the behavior requested is not necessary, and the process immediately returns to the MACRO list 505, to execute the next behavior in the MACRO list. If the sound file that it has been instructed to fade is indeed currently playing, then at 963 the MCU 109 utilizes the duration d parameter to calculate the required fade rate and adjusts the playback amplitude in order to accomplish the necessary volume adjustment. The process then immediately returns to the MACRO list, 505 to execute the next behavior in the macro.

If the behavior has been decoded to be "Stop Sound File", then the logic continues at process 964. Based on the contents of the message monitored or received from the IDCS 101 and the lookup table, the program logic will have determined the appropriate sound file ID (n) of the sound file that should be stopped. At 964 the program will check to determine if the sound file that it has been instructed to stop is currently playing. If it is not, then the behavior requested is not necessary, and the process immediately returns to the MACRO list at 505, to execute the next behavior in the MACRO list. If the sound file that it has been instructed to stop is indeed currently playing, then at 964 the MCU 109 stops playback of that sound file. The process then immediately returns to the MACRO list, 505 to execute the next behavior in the macro.

If the behavior has been decoded to be "Stop All Sounds", then the logic continues at process 965. At 965 the MCU 109 stops playback of all sound files currently being played back. The process then immediately returns to the MACRO list, 505 to execute the next behavior in the macro.

If the behavior has been decoded to be "Configure Sound File", then the logic continues at process 966. Based on the contents of the message monitored or received from the IDCS 101 and the lookup table, the program logic will have determined the appropriate sound file ID (n) and the filename (f) of the file stored in the SD card 111 which should be associated with that file ID (n). At 966 the MCU 109 will configure its internal file directory to associate that file ID (n) with the filename (f). The process then immediately returns to the MACRO list, 505 to execute the next behavior in the macro.

If the behavior has been decoded to be "Load Sound File", then the logic continues at process 967. Based on the contents of the message monitored or received from the IDCS 101 and the lookup table, the program logic will have determined the specific filename (f) of a file to be stored in the SD card 111 and will have received the encoded audio file data (d) that should be stored on the SD card 111 at the memory location associated with that filename (f). Note that this capability is only available with IDCS protocols such as CAN FD that offer support for data fields large enough to represent encoded audio files. At 967 the MCU 109 stores the encoded audio file (d) on the SD card 111 at the memory location associated with filename (f). The process then immediately returns to the MACRO list, 505 to execute the next behavior in the macro.

If the behavior has been decoded to be "Store Private Key", then the logic continues at process 968. Based on the contents of the message monitored or received from the IDCS 101 and the lookup table, the program logic will have determined the specific cryptographic key (k) that should be stored. At 968 the MCU 109 stores the cryptographic key (k) within the Alert Controller in order to allow playback of encrypted sound files. The process then immediately returns to the MACRO list, 505 to execute the next behavior in the macro.

If the behavior has been decoded to be "Send Message to IDCS", then the logic continues at process 969. The MCU 109 sends a message M specified in the MACRO list on the IDCS 101 for all devices to see. This message may be the found in another ENTRY LIST 721, 841 and may cause additional behavior in the system. The message may also communicate with or trigger any other vehicle systems coupled to the IDCS 101, including but not limited to the internal infotainment system. The process then immediately returns to the MACRO list, 505 to execute the next behavior in the macro.

If the behavior has been decoded to be "Pause", then the logic continues at process 970. The MCU initiates a countdown timer to pause execution of the MACRO until the timer has completed. The timer is does not affect other elements of the system, only the running MACRO 505. The timer is assigned an ID so that another behavior 971 may cancel the timer and the MACRO before it has completed. If the timer has not been cancelled by the specified time t, the MCU 109 continues with the macro. The process then immediately returns to the MACRO list, 505 to execute the next behavior in the macro. If the behavior 971 is called with the same id as the timer, the MCU 109 cancels the timer and stops the MACRO without returning to 505 to execute the next behavior.

If the behavior has been decoded to be "Cancel Timer", then the logic continues at process 971. The MCU uses the ID stored in the MACRO list 505 to cancel a running timer. If the timer exists with such an ID, it is stopped by the MCU 109 and the associated MACRO is cancelled. The process then immediately returns to the MACRO list, 505 to execute the next behavior in the macro.

Two additional meta-behaviors are not included in FIG. 9A or FIG. 9B. and are shown in FIG. 5, 7, 8—Reset ENTRY LIST 720, 840 and Reset MACRO 506. These are used to clear the state of a certain ENTRY LIST 726, 846 or stop the MACRO 505.

Illustrative examples of an ENTRY LIST and MACRO are given below:

ENTRY LIST A: Message Observed: "Dashboard Button Pressed"—Call MACRO A

MACRO A: "Play 'I'm Here' Sound"

In this scenario, the system observes a message on the IDCS 101 and if it matches the only message in ENTRY LIST A 502, 722, then it calls MACRO A 724, 727, 504, which fires the behavior 505 "Play complete sound file" with the ID of the 'I'm Here' Sound 961.

A more complex example of a collection of ENTRY LISTS and MACROS is given below:

ENTRY LIST A: Messages Observed in any order: "All seats unoccupied" "All Doors Locked" "Engine Shut off"—Call MACRO A MACRO A: "Pause for 30 seconds with timer ID 1" "Send message to IDCS 'Vehicle unoccupied'"

ENTRY LIST B: Message Observed "Seat Occupied"—Call MACRO B

ENTRY LIST C: Message Observed "Door Unlocked"—Call MACRO B

MACRO B: "Cancel timer with ID 1" "Play 'Welcome back' Sound" "Send message to IDCS 'Vehicle occupied'"

ENTRY LIST D: Message Observed in any order "Vehicle Unoccupied" (disabled by "Vehicle Occupied) "Parking brake status—off" (disabled by "Parking break status—on")—Call MACRO C MACRO C: "Play 'Brake off' Alert"

In this case, the system waits 30 seconds after a user has left the vehicle. If the brake is not on, the car plays an alert tone to let the user know. If the brake is turned on, the alert is not played. The "Parking brake status—on" message serves as a disable for the second item in ENTRY LIST D, and the "Vehicle occupied" message serves as a disable for the first item in ENTRY LIST D.

Embodiments of the present invention can generate audio alerts in a wide range of scenarios identified through messages on the IDCS. The following is a list of some possible scenarios, without limitation:

Produce an external audible alert if driver makes a quick change of direction with or without signaling, e.g., to swerve to avoid an obstacle.

Produce an external audible alert upon detecting a lane change violation via the lane change assist system.

Produce an external audible alert upon detecting that another vehicle is veering toward or in front of this vehicle (e.g., about to cut off this vehicle) from another lane, e.g., based on proximity sensors on the vehicle or based on receipt of inaudible signals discussed above.

Produce an external audible alert upon detecting another vehicle approaching this vehicle at too fast a rate (e.g., another vehicle approaching from behind when this vehicle has stopped or slowed, or another vehicle backing out of a parking space toward this vehicle), preferably directed toward the oncoming vehicle.

Produce an external audible alert, while the vehicle is parked in a parking lot, and possibly turned off and unoccupied, upon detecting another vehicle approaching at a rate of speed and trajectory that suggests that a collision may be imminent.

Produce an external audible alert upon the vehicle making an autonomous action such as swerving to avoid an obstacle such as a pothole (e.g., via signal from a pothole detection system), another vehicle, a pedestrian, etc.

Produce an external audible alert if the vehicle begins moving with nobody in the driver seat. For example, there was a report of a bus driver who left her bus in neutral rather than park, and it careened backwards down the street and hit numerous cars and a building; an external alert system of the type described herein could have generated a loud audible alert, preferably in the direction of travel, to warn people!!

Produce an external audible alert to alert others that this vehicle is approaching (e.g., the vehicle approaching an intersection or a crowd of people, or a drone arriving at a delivery location).

Produce an external audible alert upon detecting that another vehicle is in the process of pulling out in front of this vehicle (such as from a parking lot or side street), e.g., based on proximity sensors on the vehicle or based on receipt of inaudible signals discussed above.

Produce an external audio alert when this vehicle makes any of certain autonomous actions (e.g., when the automatic braking system applies brakes).

Produce an external audible voice alert to notify others of vehicle status information, such as, for example, telling a pedestrian something like "I see you, go ahead, I'll wait" or signaling another vehicle to proceed (e.g., at a four-way stop sign, in addition to or as a substitute for human-human eye contact or other gestures).

Produce an external audible and/or ultrasonic alert upon detecting a potential or imminent collision with a dog or other animal (e.g., using a camera and digital image processing to identify a potential obstacle and determining an appropriate alert based on the type of potential obstacle).

In various embodiments, a log of vehicle status information and/or generated audio alerts may be maintained by the Alert Controller or by a device receiving such information from the Alert Controller, e.g., over the IDCS. Such logged information may be presented to the vehicle operator, e.g., upon start-up of the system, or may be retrieved, e.g., by a police officer investigating an accident. Thus, for example, if an external audio alert was generated while the vehicle operator was away from the vehicle (e.g., detection of a possible intruder or of a near accident condition), upon his/her return the vehicle operator can be informed of the vehicle and alert status.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer capable of executing the process steps in the claims below is also included in the present invention. Likewise, a computer program product including computer executable instructions for executing the process steps in the claims below and stored on a computer readable medium is included within the present invention. Data signals embodying computer program instructions and/or messages received or transmitted over a communication system are also included within the present invention. Unless the context requires otherwise, the various functions and features described herein can be used in combination even if claimed individually. Thus, for example, it is contemplated that dependent claims included below could be rewritten into multiple dependent form to depend from the base claim and any intervening claim(s).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of producing an external audio alert for use in the course of operation of a motor vehicle having an internal digital communication system used to control or monitor the motor vehicle via a stream of messages, the method implemented by computer processes comprising:
    processing of the stream of messages, by an alert processor coupled to the internal digital communication system and configured to snoop on the stream of messages on the internal digital communication system, to characterize a current state of the vehicle based on the stream of messages;
    processing by the alert processor of the current vehicle state to determine whether the current vehicle state corresponds to an alert condition; and
    in the event that the current vehicle state does correspond to the alert condition, causing by the alert processor generation of an external audio alert corresponding to the alert condition.

2. The method of claim 1, wherein the external audio alert is selected from the group consisting of being user-programmable, being user-selectable, and combinations thereof.

3. The method of claim 1, further comprising:
    determining by the alert processor at least one direction for the external audio alert; and
    causing generation of the external audio alert in the at least one direction.

4. The method of claim 3, wherein the vehicle includes a plurality of audio transducers, and wherein causing generation of the external audio alert in at least one direction comprises at least one of:
    causing generation of the external audio alert by a set of audio transducers corresponding to the at least one direction; or
    causing generation of the external audio alert by a set of audio transducers with different delay and/or phase.

5. The method of claim 1, wherein the vehicle includes an alert selection interface coupled to the internal digital communication system to cause generation of an operator-initiated alert message over the internal digital communication system, and pursuant to which the alert processor causes generation of the external audio alert corresponding to the operator-initiated alert message.

6. The method of claim 1, wherein computer processes further comprise:
    processing by the alert processor to cause generation of the external audio alert at a volume level and/or for a duration of time appropriate to the particular alert message and the state of the vehicle.

7. The method of claim 1, wherein computer processes further comprise:
    processing by the alert processor to cause creation of a digitally encoded message intended to be transmitted to and received by one or more other vehicles in the vicinity;
    processing by the alert processor to modulate an external audio alert, within an audible or non-audible frequency spectrum, with a digitally encoded message; and
    processing by the alert processor to cause generation of the external audio alert, modulated with a digitally encoded message to other vehicles, corresponding to the alert condition.

8. The method of claim 1, wherein in the event that the current vehicle state does correspond to the alert condition, further causing at least one behavior in addition to generation of the external audio alert.

9. An alert controller for producing an external audio alert for use in the course of operation of a motor vehicle, the alert controller comprising:
    an alert processor; and
    a bus node interface for connecting the alert processor to an internal digital communication system used to control or monitor the vehicle via a stream of messages, the alert processor configured to snoop on the stream of messages on the internal digital communication system and to perform computer processes comprising:
    processing of the stream of messages on the internal digital communication system to characterize a current state of the vehicle based on the stream of messages;
    processing of the current vehicle state to determine whether the current vehicle state corresponds to an alert condition; and
    in the event that the current vehicle state does correspond to the alert condition, causing by the alert processor generation of an external audio alert corresponding to the alert condition.

10. The alert controller of claim 9, wherein at least one of: the external audio alert is user-selectable; or the external audio alert is user-programmable.

11. The alert controller of claim 9, wherein causing generation of the external audio alert comprises at least one of:
    causing generation of the external audio alert at a volume level appropriate to the particular alert message and the state of the vehicle; or
    causing generation of the external audio alert for a duration of time appropriate to the particular alert message and the state of the vehicle.

12. The alert controller of claim 9, further comprising:
    determining by the alert processor at least one direction for the external audio alert; and
    causing generation of the external audio alert in the at least one direction.

13. The alert controller of claim 12, wherein the vehicle includes a plurality of audio transducers, and wherein causing generation of the external audio alert in at least one direction comprises at least one of:
    causing generation of the external audio alert by a set of audio transducers corresponding to the at least one direction; or
    causing generation of the external audio alert by a set of audio transducers with different delay and/or phase.

14. The alert controller of claim 9, wherein the vehicle includes an alert selection interface coupled to the internal digital communication system to cause generation of an operator-initiated alert message over the internal digital communication system, and pursuant to which the alert processor causes generation of the external audio alert corresponding to the operator-initiated alert message.

15. The alert controller of claim 14, wherein the alert selection interface comprises a plurality of buttons and wherein the operator-initiated alert message corresponds to operation of at least one of the plurality of buttons.

16. The alert controller of claim 15, wherein the alert selection interface is on the steering wheel of the vehicle.

17. The alert controller of claim 9, wherein causing generation of an external audio alert corresponding to the alert condition comprises:

processing by the alert processor to cause creation of a digitally encoded message, corresponding to the alert condition, intended to be transmitted to and received by one or more other vehicles in the vicinity;

processing by the alert processor to modulate an audio signal, within an audible or non-audible frequency spectrum, with the digitally encoded message; and processing by the alert processor to cause generation of the external audio alert including the modulated audio signal.

18. The alert controller of claim 9, wherein the alert processor is further coupled to a wireless communication system.

19. The alert controller of claim 9, wherein in the event that the current vehicle state does correspond to the alert condition, further causing by the alert processor at least one behavior in addition to generation of the external audio alert.

20. The alert controller of claim 19, wherein the at least one behavior includes sending by the alert processor a message on the internal digital communication system.

* * * * *